(12) United States Patent
Quinn et al.

(10) Patent No.: US 10,351,478 B2
(45) Date of Patent: Jul. 16, 2019

(54) ADVANCED CURING EQUIPMENT AND METHODS OF USING SAME

(71) Applicant: Solidia Technologies, Inc., Piscataway, NJ (US)

(72) Inventors: Sean Camron Quinn, Branchburg, NJ (US); Kenneth Michael Smith, Somerville, NJ (US); Devin M. Patten, Red Bank, NJ (US); Xudong Hu, Monroe, NJ (US); George Perry, Metuchen, NJ (US); Vahit Atakan, Princeton, NJ (US); Jitendra Jain, Edison, NJ (US); Anuj Seth, East Brunswick, NJ (US); Ahmet Cuneyt Tas, Piscataway, NJ (US); Alan Thomas Blacklock, Clark, NJ (US); Thomas Schuler, Landenberg, PA (US); Christopher J. Grootenboer, Bryan, OH (US); Dan Castoro, Lincroft, NJ (US)

(73) Assignee: Solidia Technologies, Inc., Piscataway, NJ (US)

( * ) Notice: Subject to any disclaimer, the term of this patent is extended or adjusted under 35 U.S.C. 154(b) by 44 days.

(21) Appl. No.: 15/716,392

(22) Filed: Sep. 26, 2017

(65) Prior Publication Data
US 2018/0194693 A1    Jul. 12, 2018

Related U.S. Application Data

(63) Continuation-in-part of application No. 14/818,629, filed on Aug. 5, 2015, and a continuation-in-part of application No. 14/602,313, filed on Jan. 22, 2015.

(Continued)

(51) Int. Cl.
*B01J 19/00* (2006.01)
*C04B 14/06* (2006.01)
(Continued)

(52) U.S. Cl.
CPC ....... *C04B 40/0231* (2013.01); *B01J 19/0013* (2013.01); *B01J 19/0033* (2013.01);
(Continued)

(58) Field of Classification Search
CPC .. C04B 40/0231; C04B 28/02; B01J 19/0013; B01J 19/033; B01J 2219/00051; B01J 2219/00164
See application file for complete search history.

(56) References Cited

U.S. PATENT DOCUMENTS 4,117,059 A * 9/1978 Murray ..................... B28B 1/00
                                                    264/162
5,549,859 A * 8/1996 Andersen ................ C04B 28/02
                                                    264/102

(Continued)

FOREIGN PATENT DOCUMENTS

EP        3393017 A1 * 10/2018  ............. H02K 15/12
WO     2017041188 A1     3/2017

OTHER PUBLICATIONS

J. M. Bukowski and R. L. Berger, Cement and Concrete Research, vol. 9, pp. 57-68, Jan. 1979.

*Primary Examiner* — Stephen M Gravini
(74) *Attorney, Agent, or Firm* — Dentons US LLP

(57) ABSTRACT

Apparatus and methods for improving the curing process of materials that cure under reaction with $CO_2$ and that do not cure in the presence of water alone are described, and examples are given.

25 Claims, 22 Drawing Sheets

Related U.S. Application Data

(60) Provisional application No. 62/399,949, filed on Sep. 26, 2016, provisional application No. 61/930,404, filed on Jan. 22, 2014, provisional application No. 62/033,366, filed on Aug. 5, 2014.

(51) Int. Cl.
*C04B 24/26* (2006.01)
*C04B 24/38* (2006.01)
*C04B 28/02* (2006.01)
*C04B 40/02* (2006.01)

(52) U.S. Cl.
CPC ..... *C04B 28/02* (2013.01); *B01J 2219/00051* (2013.01); *B01J 2219/00164* (2013.01)

(56) References Cited

U.S. PATENT DOCUMENTS

| | | | |
|---|---|---|---|
| 5,660,900 A * | 8/1997 | Andersen | B29C 55/18 428/35.6 |
| 6,065,224 A * | 5/2000 | Eigner | C05F 17/0247 34/135 |
| 7,272,895 B2 * | 9/2007 | La Gioia | B30B 9/06 100/50 |
| 8,096,064 B2 * | 1/2012 | Matsunaga | F26B 7/00 34/396 |
| 8,407,912 B2 * | 4/2013 | Hubbard, Jr. | F26B 3/12 34/82 |
| 8,499,471 B2 * | 8/2013 | Coronella | F02C 3/28 15/26 |
| 8,898,927 B2 * | 12/2014 | Shan | A24B 3/18 34/282 |
| 9,221,027 B2 * | 12/2015 | Kuppler | B01J 10/005 |
| 9,266,147 B2 | 2/2016 | Riman et al. | |
| 9,476,642 B2 * | 10/2016 | Kim | F26B 3/36 |
| 9,506,695 B2 * | 11/2016 | Kim | F26B 21/003 |
| 9,598,653 B2 * | 3/2017 | Bland | C10L 5/366 |
| 10,016,739 B2 * | 7/2018 | Kuppler | B01J 10/005 |
| 10,196,311 B2 * | 2/2019 | Quinn | C04B 28/24 |
| 2017/0102373 A1 * | 4/2017 | Atakan | G01N 33/383 |
| 2018/0194693 A1 * | 7/2018 | Quinn | C04B 40/0231 |
| 2019/0020252 A1 * | 1/2019 | Ma | H02K 15/12 |

\* cited by examiner

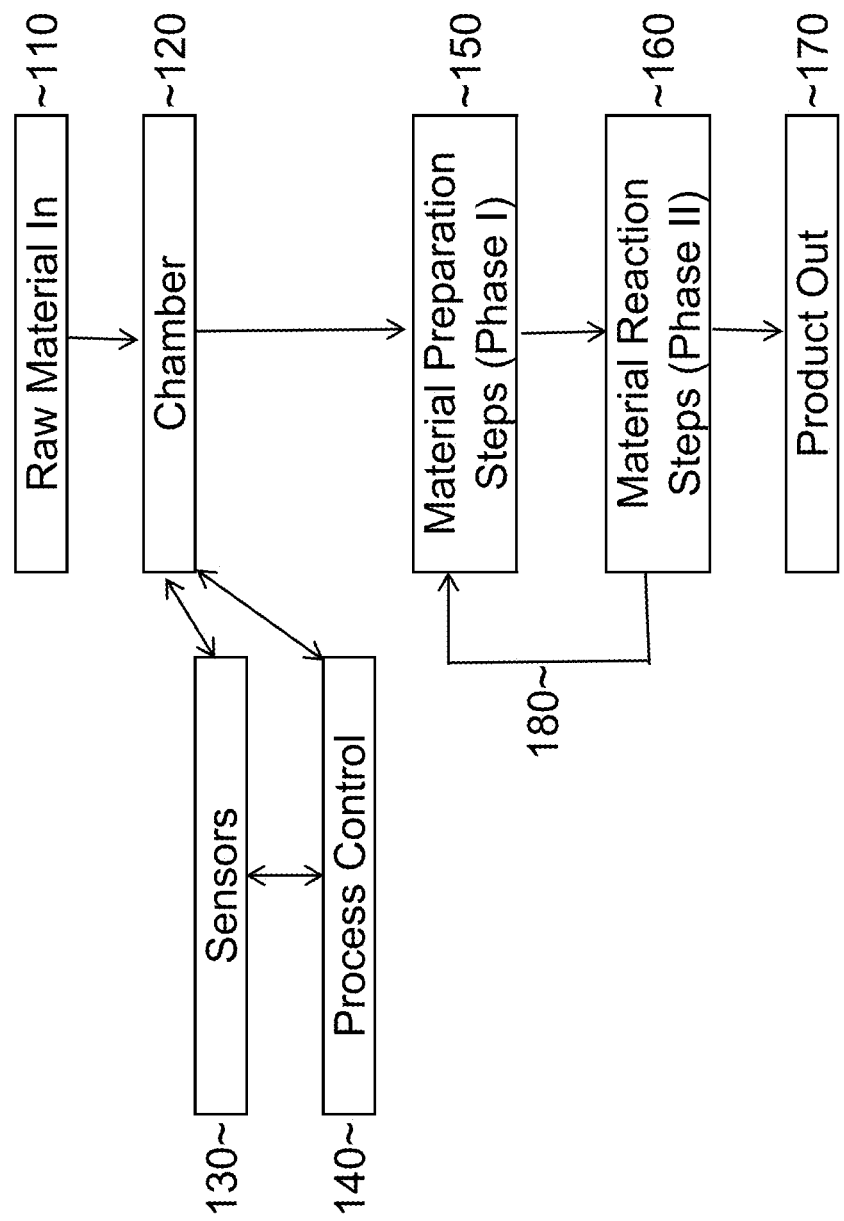

FIG. 1B

| Chamber (CO2 Containment) ~120 |
| --- |
| Contains CO2 for process purposes, for safety purposes, and to make process more economically efficient. |

Embodiments

| |
| --- |
| hard enclosue |
| soft enclosure |
| flow through enclosure |
| primary and secondary containment (eg.anteroom, air-lock, with vacuum, with positive/negative pressure) |
| air curtain |
| safety sensors (CO2 concentration monitor and alarm, pressure relief) |
| door/seal/locking device |

FIG. 1C

| Sensors | ~130 |
|---|---|
| System Sensors | Product/Location Sensors |
| Provides system input parameters for closed-loop process control, real time data monitoring, and data logging. | Provides material input parameters for closed-loop process control, real time data monitoring, and data logging. |
| Embodiments | Embodiments |
| temperature | temperature |
| relative humidity | relative humidity |
| pressure | pressure |
| $CO_2$ concentration | $CO_2$ concentration |
| $O_2$ concentration | $O_2$ concentration |
| gas flow rate | gas flow rate |
| liquid level (amount of extracted water) | load cell (mass of concrete part) |
| electrical conductivity (of extracted water) | electrical properties |
| pH (of water extracted) | pH |

FIG. 1C
(Continued)

| System Sensors Embodiments | Product/Location Sensors Embodiments |
|---|---|
| feedback from heating source | elemental analysis |
| | infrared camera |
| | ultrasound |

FIG. 1D

| Material Preparation Steps (Phase I) | ~150 | |
|---|---|---|
| Heating (energy source) | Water Extraction | Circulation |
| Provides energy to system to promote water evaporation from the concrete part during drying and curing, and to grow crystals within the concrete part during curing | a) Opens the passageways within the porous concrete part to allow CO2 infiltration; b) Removes water from the system to promote addition evaporation. | a) Promotes atmosphere uniformity throughout the system; b) Facilitates water extraction. |
| Embodiments | Embodiments | Embodiments |
| fossil fuel combustion | natural convection | internal circulation (fans inside chamber) |
| electric resistance | forced convection | External circulation (fans outside chamber) |
| Infrared | compressor | External circulation with bypass |
| dielectric drying [includes microwave and radio frequency] | dessicant | plenum |
| laser | heat exchanger/chiller | |

FIG. 1D
(continued)

| Heating (energy source) Embodiments | Water Extraction Embodiments | Circulation Embodiments |
|---|---|---|
| plasma | vacuum | |
| superheated steam | | |
| steam | | |
| conduction | | |
| radiator | | |
| radiation | | |
| heat sources such as co-generation facility | | |

FIG. 1E

| Material Reaction Steps (Phase II) ~160 |
|---|
| CO2 Delivery and Control |
| Provides CO2 to chamber, maintains target CO2 concentrations during drying and curing, and ramps down CO2 concentration prior to the completion of curing, as defined by Closed-loop Process Control |

| Embodiments |
|---|
| propotional valves |
| variable speed drives |
| programmable logic controllers (PLC) |
| temperature controllers |
| human machine interface (HMI) |
| virtual private network (VPN) |
| mass flow controller |
| I/P valve (current/pressure) |
| encoder |
| CO2 Source |
| inlet valves |
| outlet valves |

FIG. 1F

| Process control | ~140 |
|---|---|
| Receives and utilizes input parameters from System Sensors and Product/Location Sensors for achieving required process conditions for CO2-curing of concrete under feedback control. Optionally allows feedforward control (open loop control). Chamber Parameters | |

| |
|---|
| Chamber Inlet Temperature |
| Chamber Outlet Temperature |
| Chamber Inlet Absolute Humidity |
| Chamber Inlet Relative Humidity |
| Chamber Outlet Absolute Humidity |
| Chamber Outlet Relative Humidity |
| Chamber CO2 Concentration % |
| Chamber CO2 Pressure |
| Chamber CO2 Mass Flow Rate |
| Chamber Gas Flow Rate |
| Dehumidification Gas Flow Rate |
| TCU Temperature |
| Burner Management System |
| H2O Condensation |
| Total Water |
| Door Position |

FIG. 1G

| Process control | ~140 |
|---|---|
| Receives and utilizes input parameters from System Sensors and Product/Location Sensors for achieving required process conditions for CO2-curing of concrete under feedback control. Optionally allows feedforward control (open loop control). Product/Material Parameters | |
| Product temperature measured at the surface and interior and its distribution during the process | |
| Product moisture content measured at the surface and interior and its distribution during the process | |
| Product carbonation at the surface, on the bottom, in the interior and its distribution during the process | |
| Elemental composition at the surface, on the bottom, in the interior and its distribution during the process | |
| pH of the product at the surface, on the bottom, in the interior and its distribution during the process | |

ADVANCED CURING EQUIPMENT AND METHODS OF USING SAME

CROSS-REFERENCE TO RELATED APPLICATIONS

This application is a continuation-in-part of co-pending U.S. patent application Ser. No. 14/602,313 filed on Jan. 22, 2015, which in turn claimed priority to and the benefit of then U.S. provisional patent application Ser. No. 61/930,404, filed on Jan. 22, 2014, is a continuation-in-part of co-pending U.S. patent application Ser. No. 14/818,629 filed on Aug. 5, 2015, which in turn claimed priority to and the benefit of then U.S. provisional patent application Ser. No. 62/033,366, filed Aug. 5, 2014, and this application claims priority to and the benefit of U.S. provisional patent application Ser. No. 62/399,949, filed on Sep. 26, 2016, each of which applications is incorporated herein by reference in its entirety.

FIELD OF THE INVENTION

The invention relates to curing equipment in general and particularly to curing equipment that is used with materials that cure by reaction with $CO_2$.

BACKGROUND OF THE INVENTION

Systems and methods for curing materials using $CO_2$ as a reagent are known in the prior art.

J. M. Bukowski and R. L. Berger, Cement and Concrete Research, Vol. 9, pp. 57-68, January 1979, is said to describe the carbonation of non-hydraulic, $\gamma\text{-}Ca_2SiO_4$ and $CaSiO_3$, mortars and powders exposed to 100% RH and 100% $CO_2$ environments. The rate of reaction and strength development is faster in $\gamma\text{-}Ca_2SiO_4$ than in $CaSiO_3$. Increasing $CO_2$ pressure from atmospheric to 5.62 MPa [55.5 atmosphere, or 815 pounds per square inch] increases the degree of reaction in both $\gamma\text{-}Ca_2SiO_4$ and $CaSiO_3$. Strength increases as a function of degree of reaction and $CO_2$ pressures above 2.00 MPa. The potential use of non-hydraulic materials for $CO_2$ activated cements is discussed.

Also known is International Patent Application Publication No. WO 2017/041188 A1 by Al-Ghouleh et al., published on Mar. 16, 2017, which is said to describe a process for producing precast products in an airtight enclosure, which comprises the steps of a carbonation of pre-dried concrete precast units by feeding $CO_2$ gas into a closed airtight enclosure under near ambient atmospheric pressure (psig between 0 and 2) and/or low pressure (between 2 and 15 psig) conditions, wherein said pre-dried concrete units have lost between 25 to 60% of their initial mix water content.

There is a need for curing equipment and methods that provide improved curing of materials that are cured by reaction with $CO_2$.

SUMMARY OF THE INVENTION

According to one aspect, the invention features an apparatus for curing materials that cure under reaction with $CO_2$, comprising: a curing chamber configured to contain a material that consumes $CO_2$ as a reagent, the material does not cure in the absence of $CO_2$ during curing, the material does not cure in the presence of water alone, and the material does not consume water during curing, the curing chamber having at least one port configured to allow the material to be introduced into the curing chamber and to be removed from the curing chamber, and having at least one closure for the port, the closure configured to provide an atmospheric seal when closed so as to prevent contamination of a gas present in the curing chamber by gas outside the curing chamber; a source of carbon dioxide or air configured to provide gaseous carbon dioxide or air to the curing chamber by way of a gas entry port in the curing chamber, the source of carbon dioxide or air having at least one flow regulation device configured to control a flow rate of the gaseous carbon dioxide or air into the curing chamber; a gas flow subsystem configured to circulate the gaseous carbon dioxide or air through the curing chamber; a temperature control subsystem configured to control a temperature of the gas within the chamber; a humidity control subsystem configured to control a humidity in the gas within the chamber; and at least one controller in communication with at least one of the source of carbon dioxide, the gas flow subsystem, the temperature control subsystem, and the humidity control subsystem, the at least one controller is configured to control independently at least a respective one of the flow rate of the gas inside the chamber, the circulation of the gas through the curing chamber, the temperature of the gas, and the humidity in the gas, the at least one controller is configured to provide a time of residence in a first drying phase (Phase 1), wherein a residence time in the first drying phase is configured to be minimized, and the at least one controller is configured to transition from the first drying phase (Phase 1) to a second carbonation phase (Phase 2) at the end of the first drying phase (Phase 1).

The absolute pressure of the curing process executed in said chamber takes place at pressures in the range of 0.1 atmospheres to lower than 5 atmospheres absolute pressure in order to avoid the use of complex, pressure-rated components. Preferably, the process takes place between 0.68-1.36 atmospheres (10-20 psi) absolute pressure. More preferably, the process takes place between 0.98-1.02 atmospheres (14.5-14.9 psi) absolute pressure.

In one embodiment, the apparatus is configured to first expose the material to the first drying phase (Phase 1) in absence of deliberately added $CO_2$.

In another embodiment, the apparatus is configured to first expose the material to the first drying phase (Phase 1) in presence of $CO_2$.

In yet another embodiment, the apparatus is configured to detect a transition from the first drying phase (Phase 1) to the second carbonation phase (Phase 2) by detecting a change in one or more electrical properties of the material on the surface or in the bulk thereof.

In still another embodiment, the one or multiple electrical properties of the material include at least one of a surface resistivity, a volume resistivity, a conductivity, an impedance, a capacitance, a dielectric constant, a dielectric strength, a permittivity, a piezoelectric constant, and a Seebeck coefficient.

In a further embodiment, the apparatus is configured to detect the transition from the first drying phase (Phase 1) to the second carbonation phase (Phase 2) by detecting a change in the quantity of water that is removed from the material.

In yet a further embodiment, the apparatus is configured to detect the transition from the first drying phase (Phase 1) to the second carbonation phase (Phase 2) by detecting a change in the rate of water removed from the material.

In an additional embodiment, the apparatus is configured to detect the transition from the first drying phase (Phase 1)

to the second carbonation phase (Phase 2) by detecting a change in the rate of water collected from the gas circulating in the chamber.

In one more embodiment, the apparatus is configured to detect the transition from the first drying phase (Phase 1) to the second carbonation phase (Phase 2) by detecting a change in at least one of a $CO_2$ concentration and an $O_2$ concentration in the gas circulating in the chamber.

In still a further embodiment, the apparatus is configured to detect the transition from the first drying phase (Phase 1) to the second carbonation phase (Phase 2) by detecting a change in the relative humidity of the gas circulating in the chamber.

In one embodiment, the apparatus is configured to detect the transition from the first drying phase (Phase 1) to the second carbonation phase (Phase 2) by detecting a change in temperature of the gas circulating in the chamber.

In yet another embodiment, the apparatus is configured to detect the transition from the first drying phase (Phase 1) to the second carbonation phase (Phase 2) by detecting a change in temperature of the material.

In still another embodiment, the apparatus is configured to monitor the change in temperature of the material using an infrared camera.

In a further embodiment, the apparatus is configured to detect the transition from the first drying phase (Phase 1) to the second carbonation phase (Phase 2) by detecting a change in the pressure inside the chamber.

In yet a further embodiment, the apparatus is configured to measure, track and control the pressure inside the chamber throughout the process in any of the first drying phase (Phase 1) and the second curing phase (Phase 2).

In an additional embodiment, the apparatus is configured to detect the transition from the first drying phase (Phase 1) to the second carbonation phase (Phase 2) by detecting a change in the pH of the material.

In one more embodiment, the apparatus is configured to detect the transition from the first drying phase (Phase 1) to the second carbonation phase (Phase 2) by detecting a change in the pH of the water collected during curing of the material.

In still a further embodiment, the apparatus is configured to detect the transition from the first drying phase (Phase 1) to the second carbonation phase (Phase 2) by detecting a change in the elemental composition of the material.

In one embodiment, the apparatus is configured to measure, track and control the elemental composition of the material throughout the process in any of the first drying phase (Phase 1) and the second carbonation phase (Phase 2).

In another embodiment, the apparatus is configured to detect the transition from the first drying phase (Phase 1) to the second carbonation phase (Phase 2) by detecting a change in the response of the material to ultrasonic stimulation.

In yet another embodiment, the temperature control subsystem further comprises at least one energy source configured to heat at least one of the gas and the material.

In still another embodiment, the temperature control subsystem is configured to control the material temperature, a rate of water removal in the first drying phase (Phase 1) and a rate of reaction in the second carbonation phase (Phase 2).

In a further embodiment, the energy source is configured to control the time of residence in at least one of the first drying phase (Phase 1) and the second carbonation phase (Phase 2).

In yet a further embodiment, the energy source is configured to employ fossil fuel combustion.

In an additional embodiment, the energy source is configured to employ electrical resistance heating.

In one more embodiment, the energy source is configured to employ an infrared heat source.

In still a further embodiment, the energy source is configured to employ a laser.

In one embodiment, the energy source is configured to employ dielectric heating.

In another embodiment, the energy source configured to employ dielectric heating uses microwave frequency waves or radio frequency waves.

In yet another embodiment, the energy source configured to employ dielectric heating uses radio frequencies in the Industrial, Science and Medical band (ISM band).

In still another embodiment, the energy source is configured to employ plasma heating.

In a further embodiment, the energy source is configured to employ steam heating.

In yet a further embodiment, the energy source is configured to employ superheated steam.

In an additional embodiment, the energy source is configured to employ conduction.

In one more embodiment, the energy source is configured to employ a radiator.

In still a further embodiment, the energy source is configured to employ a radiation heat source.

In one embodiment, the energy source is configured to employ a co-generation facility.

In another embodiment, the humidity control subsystem is configured to control the water extraction from the material.

In yet another embodiment, the humidity control subsystem is configured to control the water extraction from the gas in the chamber during at least one of the first drying phase (Phase 1) and the second carbonation phase (Phase 2).

In still another embodiment, the humidity control subsystem is configured to control the water extraction using natural convection.

In a further embodiment, the humidity control subsystem is configured to control the water extraction using forced convection.

In yet a further embodiment, the humidity control subsystem is configured to control the water extraction using a compressor.

In an additional embodiment, the humidity control subsystem is configured to control the water extraction using a desiccant.

In one more embodiment, the humidity control subsystem is configured to control the water extraction using one of a heat exchanger and a chiller.

In still a further embodiment, the humidity control subsystem is configured to control the water extraction using lower than atmospheric pressure.

In one embodiment, the gas flow subsystem is configured to control the circulation of the gas in the chamber to control the water removal in the first drying phase (Phase 1).

In another embodiment, the gas flow subsystem is configured to control a flow and a velocity of the gas adjacent to the material.

In yet another embodiment, the gas flow subsystem is configured to control the circulation of the gas in the chamber to control the rate of reaction in the second carbonation phase (Phase 2).

In still another embodiment, the gas flow subsystem is configured to control the flow and velocity of the gas using a plenum.

In a further embodiment, the gas flow subsystem is configured to control the flow and velocity of the gas using an internal circulation system.

In yet a further embodiment, the internal circulation system comprises a fan.

In an additional embodiment, the gas flow subsystem is configured to control the flow and velocity of the gas using an external circulation system.

In one more embodiment, the external circulation system comprises a fan.

In still a further embodiment, the apparatus comprises an internal circulation system, an external circulation system and a bypass configured to proportion a gas flow between the internal circulation system and the external circulation system.

In one embodiment, the apparatus comprises multiple internal circulation systems, multiple external circulation systems, multiple heaters, and multiple dehumidification systems so as to comprise multiple independent control zones within the curing chamber.

In another embodiment, the gas flow regulation device is configured to change the concentration of $CO_2$ during the first drying phase (Phase 1) and second carbonation phase (Phase 2) to maximize the efficiency of $CO_2$ consumption during the curing process.

In yet another embodiment, the concentration of $CO_2$ is reduced during the second carbonation phase (Phase 2).

According to another aspect, the invention relates to a method of curing a material that consumes $CO_2$ as a reagent, the material does not cure in the absence of $CO_2$ during curing, the material does not cure in the presence of water alone, and the material does not consume water during curing, comprising the steps of: providing an apparatus comprising: a curing chamber configured to contain a material that consumes $CO_2$ as a reagent, the material does not cure in the absence of $CO_2$ during curing, the material does not cure in the presence of water alone, and the material does not consume water during curing, the curing chamber having at least one port configured to allow the material to be introduced into the curing chamber and to be removed from the curing chamber, and having at least one closure for the port, the closure configured to provide an atmospheric seal when closed so as to prevent contamination of a gas present in the curing chamber by gas outside the curing chamber; a source of carbon dioxide or air configured to provide gaseous carbon dioxide or air to the curing chamber by way of a gas entry port in the curing chamber, the source of carbon dioxide or air having at least one flow regulation device configured to control a flow rate of the gaseous carbon dioxide or air into the curing chamber; a gas flow subsystem configured to circulate the gaseous carbon dioxide or air through the curing chamber; a temperature control subsystem configured to control a temperature of the gas within the chamber; a humidity control subsystem configured to control a humidity in the gas within the chamber; and at least one controller in communication with at least one of the source of carbon dioxide, the gas flow subsystem, the temperature control subsystem, and the humidity control subsystem, the at least one controller is configured to control independently at least a respective one of the flow rate of the gas inside the chamber, the circulation of the gas through the curing chamber, the temperature of the gas, and the humidity in the gas, the at least one controller is configured to provide a time of residence in a first drying phase (Phase 1), wherein a residence time in the first drying phase is configured to be minimized, and the at least one controller is configured to transition from the first drying phase (Phase 1) to a second carbonation phase (Phase 2) at the end of the first drying phase (Phase 1), performing a first drying phase having a first time of residence in the first dying phase, and performing a second curing phase at the end of the first drying phase.

In an aspect, the invention relates to an apparatus for curing of materials that harden under reaction with $CO_2$ and that do not harden in the presence of water alone, comprising: a curing chamber configured to contain a material that consumes $CO_2$ as a reagent and that does appreciably harden in the absence of $CO_2$, said curing chamber having at least one port configured to allow said material to be introduced into said curing chamber and to be removed from said curing chamber, and having at least one closure for said port, said closure configured to provide an atmospheric seal when closed so as to prevent contamination of a gas present in said curing chamber by gas outside said curing chamber; a source of carbon dioxide or air configured to provide gaseous carbon dioxide or air to said curing chamber by way of a gas entry port in said curing chamber, said source of carbon dioxide or air having at least one flow regulation device configured to control a flow rate of said gaseous carbon dioxide or air into said curing chamber; a gas circulation subsystem configured to circulate said gas through said curing chamber at a controlled flow rate and velocity; a temperature control subsystem configured to control a temperature of said gas within said chamber; a humidity control subsystem configured to control a humidity in said gas within said chamber; and at least one controller in communication with at least one of said source of carbon dioxide, said gas circulation subsystem, said temperature control subsystem, and said humidity control subsystem, wherein, said at least one controller is configured to control independently at least a respective one of said flow rate of said gas inside the chamber, said circulation of said gas through said curing chamber, said temperature of said gas, and said humidity in said gas, to reduce a time of residence in a first dying phase (Phase 1), and configured to perform a second carbonation phase (Phase 2) at the end of said first drying phase (Phase 1).

In another aspect, the invention relates to a method of curing materials that harden under reaction with $CO_2$ and that do not harden in the presence of water alone, comprising the steps of: performing a first drying phase (Phase 1) having a reduced time of residence in said first drying phase (Phase 1), and performing a second carbonation phase (Phase 2) at the end of said first drying phase (Phase 2).

In another aspect, the invention relates to a method of curing materials that harden under reaction with $CO_2$ and that do not harden in the presence of water alone, comprising the steps of: performing a first drying phase (Phase 1) having a reduced time of residence in said first drying phase (Phase 1), performing a second carbonation phase (Phase 2) at the end of said first drying phase (Phase 2), and repeating said first drying phase (Phase 1) and second carbonation phase (Phase 2) at least once.

In an embodiment, the invention relates to a method of curing materials that harden under reaction with $CO_2$ and that do not harden in the presence of water alone, comprising the steps of: performing a first drying phase (Phase 1) having a reduced time of residence in said first drying phase (Phase 1), performing a second carbonation phase (Phase 2) at the end of said first drying phase (Phase 1), and repeating said first drying phase (Phase 1) and second carbonation phase (Phase 2) more than once.

In an embodiment, the invention relates to a method of curing materials that harden under reaction with $CO_2$ and that do not harden in the presence of water alone, comprises of removing the balance moisture in the product as a part of any of the second carbonation phases (Phase 2). In some embodiments the removing of the balance moisture in the product comprises of any of the first drying phase (Phase 1).

In various embodiments, the systems and methods of the invention are expected to enable the following features and capabilities individually or in combination:

Control the temperature of the product to be cured by any individual or combination of methods and hardware as indicated in FIG. 1D during any of the drying phases (Phase 1) and/or any of the carbonation phases (Phase 2).

Control the velocity of gas local to the products as well as the circulation velocity and volume throughout the curing system by any individual or combination of methods and hardware as indicated in FIG. 1D during any of the drying phases (Phase 1) and/or any of the carbonation phases (Phase 2).

Control the relative humidity of the gas local to the products as well as within the circulating gas throughout the curing system by any individual or combination of methods and hardware as indicated in FIG. 1D during any of the drying phases (Phase 1) and/or any of the carbonation phases (Phase 2).

Facilitate the removal of excess moisture from the circulating gas (dehumidification) or increase the moisture content of the circulating gas (humdification) by any individual or combination of methods and hardware as indicated in FIG. 1D during any of the drying phases (Phase 1) and/or any of the carbonation phases (Phase 2).

Control the $CO_2$ concentration of the gas local to the products as well as within the circulating gas throughout the curing system by any individual or combination of methods and hardware as indicated in FIG. 1E during any of the drying phases (Phase 1) and/or any of the carbonation phases (Phase 2).

Facilitate the removal of water from the products (evaporation) to be cured by controlling the velocity, temperature, and humidity of the gas stream local to the products.

Control the velocity, temperature, and humidity of the gas stream local to the products in such a manner that a desirable evaporation rate and subsequent distribution of moisture in the pore structure of the product is created and maintained during any of the drying phases (Phase 1) and/or any of the carbonation phases (Phase 2).

Incorporate sensor outputs from the product and/or the curing system as listed in FIG. 1C to be analyzed by the curing system to control the velocity, temperature, and humidity of the gas stream local to the products, and thus evaporation rate, in order to remove the quantity of water specified and create or maintain the distribution of moisture in the pore structure of the product as specified during any of the drying phases (Phase 1) and/or any of the carbonation phases (Phase 2).

Assure that the water content of individual products and the uniformity of the water content in each individual product is uniform throughout all products within the curing system.

Narrow the distribution of water content of individual products throughout all products within the curing system by controlling the velocity, temperature, and humidity of the gas stream local to the products so that uniform evaporation rates are induced through all regions of the curing chamber.

Incorporate sensor outputs from the product and/or the curing system as listed in FIG. 1C to be analyzed by the curing system to control the velocity, temperature, and humidity of the gas stream local to the products in fixed zones throughout the chamber during any of the drying phases (Phase 1) and/or carbonation phases (Phase 2) according to the state of the products and system in order to unify the level of dryness throughout the chamber.

Incorporate sensor outputs from the product and/or the curing system as listed in FIG. 1C to be analyzed by the curing system to control the velocity, temperature, and humidity of the gas stream local to the products in the entire chamber during the any of the drying phases (Phase 1) and/or the carbonation phases (Phase 2) according to the state of the products and system.

Incorporate sensor outputs from the product and/or the curing system as listed in FIG. 1C to be analyzed by the curing system to control the $CO_2$ concentration of the circulating gas during any of the drying phases (Phase 1) and/or the carbonation phases (Phase 2) according to the state of products and system.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

FIG. 1A is a schematic diagram that illustrates exemplary embodiments of advanced curing equipment according to principles of the invention. In FIG. 1A one can optionally iterate Phase I (150) and Phase II (160) as illustrated by arrow 180, and one can optionally go from Phase I (150) to product out (170) if desired.

FIG. 1B is a schematic diagram that illustrates exemplary embodiments of chambers used in advanced curing equipment according to principles of the invention.

FIG. 1C is a schematic diagram that illustrates exemplary embodiments of sensors used in advanced curing equipment according to principles of the invention.

FIG. 1D is a schematic diagram that illustrates exemplary embodiments of a first processing phase practiced using advanced curing equipment according to principles of the invention.

FIG. 1E is a schematic diagram that illustrates exemplary embodiments of a second processing phase practiced using advanced curing equipment according to principles of the invention.

FIG. 1F is a schematic diagram that illustrates exemplary embodiments of parameters that are measured that relate to the chamber characteristics of chambers and exemplary embodiments of material parameters that are measured during processing in advanced curing equipment according to principles of the invention.

FIG. 1G is a schematic diagram that illustrates exemplary embodiments of process control components of the apparatus according to principles of the invention.

FIG. 3 is a diagram illustrating data for curing Example 1.

FIG. 9 represents g-rHLPD process Schematic. A—Dried porous $CaSiO_3$ preform; B—Partially wet $CaSiO_3$ preform; C—Final densified monolithic solid. Steps 1 to 4 represent the carbonation-densification process occurring in an individual pore: Step 1-Partially wet pore with $CO_2$; Step 2—Diffusion, dissolution and dissociation of $CO_2$; Step 3—Dissolution of $CaSiO_3$ by hydrogen ions; Step 4—Precipitation of solids. After the completion of step 4, the process takes place continuously following steps 2-4 until various kinetic factors slow down the process (e.g., thick $CO_2$ reaction layers).

FIG. 10 represents a first example of carbonation reactions involving $CO_2$ as a gas phase and liquid water in the pore structure.

FIG. 11 represents a second example of carbonation reactions involving $CO_2$ as a gas phase and liquid water in the pore structure: Carmel Quartz Composition, 8×8×1.5" Vibratory Cast reacted, 90 C, 20 PSIG reaction.

FIG. 12 represents a third example of carbonation reactions involving $CO_2$ as a gas phase and liquid water in the pore structure: 1-2-3 Composition, 8×8×2" sample size reacted at 90 C 20 PSIG, at ~90% Relative humidity.

DETAILED DESCRIPTION

Figure 2:
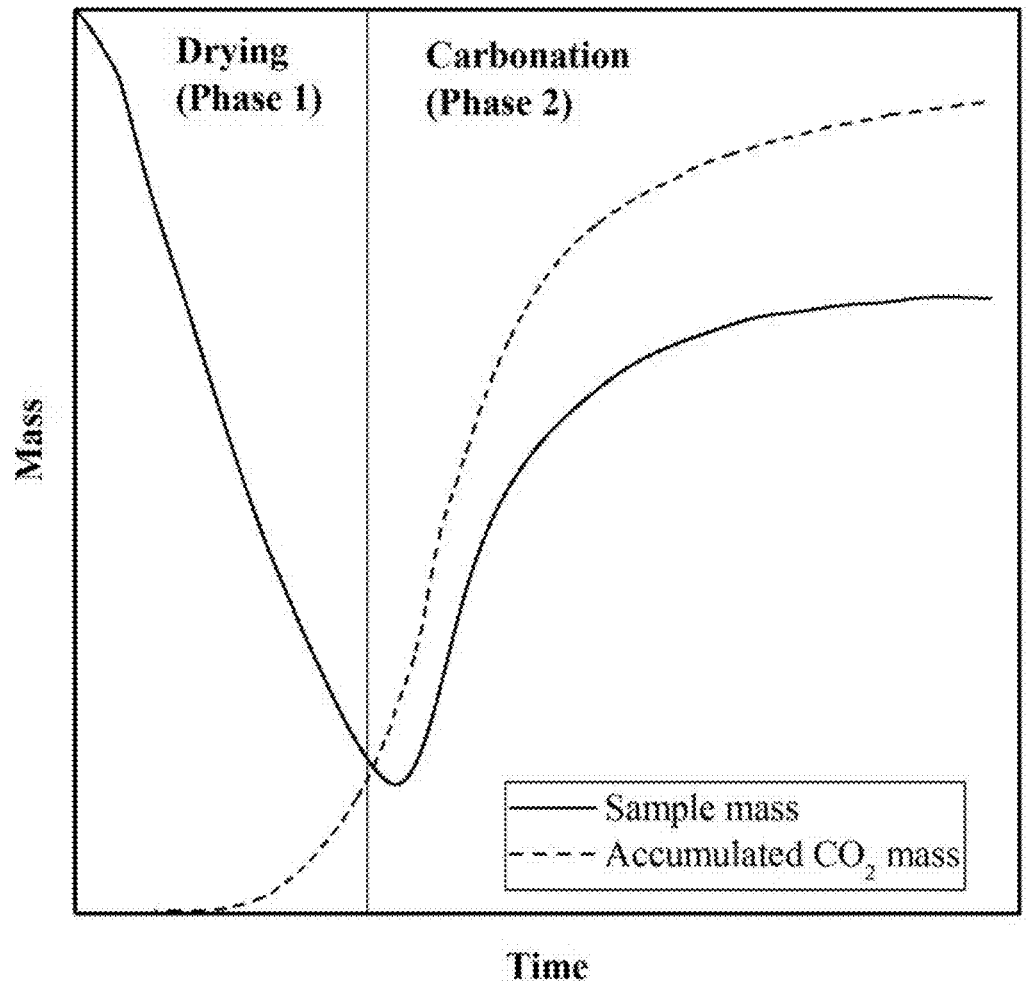
FIG. 2 is a schematic graph that illustrates the mass of a $CO_2$ Composite Material (CCM) that is being cured as a function of time during $CO_2$-curing.

The apparatus, methods and systems of the invention are useful for curing materials that require $CO_2$ for curing. The materials do not cure in the presence of $H_2O$ alone. The materials do not cure in the absence of $CO_2$. The materials do not consume water as a reagent. Such materials are described in the patent documents that are incorporated by reference herein.

The invention features a curing system for curing a material which requires $CO_2$ as a curing reagent. The curing system comprises a curing chamber configured to contain a material that consumes $CO_2$ as a reactant (or reagent) and that does not cure in the absence of $CO_2$. The curing chamber has at least one port configured to allow the material to be introduced into the curing chamber and to be removed from the curing chamber, and has at least one closure for the port, the closure configured to provide an atmospheric seal when closed so as to prevent (or to limit to an innocuous level) contamination of a gas present in the curing chamber by gas outside the curing chamber; a source of carbon dioxide configured to provide gaseous carbon dioxide to the curing chamber by way of a gas entry port in the curing chamber, the source of carbon dioxide having at least one flow regulation device configured to control a flow rate of the gaseous carbon dioxide into the curing chamber; a gas flow subsystem configured to circulate the gas through the curing chamber during a time period when the material that consumes $CO_2$ as a reactant is being cured; a temperature control subsystem configured to control a temperature of the gas within the chamber; a humidity control subsystem configured to control a humidity in the gas within the chamber to increase or decrease humidity; and at least one controller in communication with at least one of the source of carbon dioxide, the gas flow subsystem, the temperature control subsystem, and the humidity control subsystem; and at least one controller configured to control independently during a time period when the material that consumes $CO_2$ as a reactant is being cured at least a respective one of the flow rate of the gaseous carbon dioxide, the circulation of the gas through the curing chamber, the temperature of the gas, and the humidity in the gas.

The invention involves the recognition that the drying sub-process and the carbonation sub-process in the curing of $CO_2$ composite material are directly coupled to each other, so that the carbonation rate and extent can be controlled by controlling the drying rate.

The description of curing chambers and their operation that are described in U.S. Pat. No. 9,221,027, U.S. patent application Ser. No. 14/602,313, and U.S. patent application Ser. No. 14/818,629 are incorporated herein by reference in their entirety.

The absolute pressure of the curing process executed in said chamber takes place at fewer than 5 atmospheres in order to avoid the use of complex, pressure-rated components. Preferably, the process takes place between 0.68-1.36 atmospheres (10-20 psi) absolute pressure. More preferably, the process takes place between 0.98-1.02 atmospheres (14.5-14.9 psi) absolute pressure.

In some embodiments of the invention, portions of the process may proceed at less than atmospheric pressure in order to facilitate the evaporation of water from the products to be cured.

The invention contemplates a process that maximizes the carbonation rate of a composite material by controlling the drying rate of that material. The process can include a carbonation duration that is between 0 and 1,000 hours. The process can include a $CO_2$ Composite Material that has a permeability in the range of 0% to 100%. In some embodiments, the permeability within the range of 0% to 100% can have an upper bound or a lower bound of a respective one of 5%, 10%, 15%, 20%, 25%, 30%, 35%, 40%, 45%, 50%, 55%, 60%, 65%, 70%, 75%, 80%, 85%, 90% or 95%.

The process can include a $CO_2$ Composite Material that has a carbonation depth of the CCM in the range of 0 and 36 inches. The process can include a $CO_2$ Composite Material wherein the amount of water removed from the CCM is equal to between 0% and 99% of the CCM mass. In some embodiments, the amount of water removal is in the range of 10-90%, 15-90%, 20-90%, 25-90%, 30-90%, 35-90%, 40-90%, 45-90%, or 50-90% of the CCM mass.

In some embodiments, the amount of water removal is in the range of 10-85%, 15-85%, 20-85%, 25-85%, 30-85%, 35-85%, 40-85%, 45-85%, or 50-85% of the CCM mass.

In some embodiments, the amount of water removal is in the range of 10-80%, 15-80%, 20-80%, 25-80%, 30-80%, 35-80%, 40-80%, 45-80%, or 50-80% of the CCM mass.

In some embodiments, the amount of water removal is in the range of 10-75%, 15-75%, 20-75%, 25-75%, 30-75%, 35-75%, 40-75%, 45-75%, or 50-75% of the CCM mass.

In some embodiments, the amount of water removal is in the range of 10-70%, 15-70%, 20-70%, 25-70%, 30-70%, 35-70%, 40-70%, 45-70%, or 50-70% of the CCM mass.

In some embodiments, the amount of water removal is in the range of 10-65%, 15-65%, 20-65%, 25-65%, 30-65%, 35-65%, 40-65%, 45-65%, or 50-65% of the CCM mass.

A curing process for carbonatable calcium silicate concretes is defined as a process wherein concrete products are produced using carbonatable calcium silicate cements and exposed to $CO_2$ in a controlled manner to produce a cured concrete part with desirable physical and/or chemical properties.

Concrete products containing carbonatable calcium silicate cements as their primary cementitious binding agent harden during the reaction process. Monitoring the mass and $CO_2$ consumption of a concrete body during the curing process reveals two distinctive phases during curing. This is demonstrated in FIG. 2. The first phase is a drying phase, where minimal or no consumption of $CO_2$ occurs but the mass of the product decreases as water is evaporated from the product to the chamber atmosphere. The second phase is a carbonation phase, where the rate of $CO_2$ consumption increases and the mass gain from carbonation exceeds the mass loss from drying. The rate of $CO_2$ consumption and subsequent mass gain of the solid decreases as the carbonation reaction process approaches its maximum yield for the specific product and conditions employed in the curing process. Thus, the curing process is comprised of two distinct phases, a drying phase (Phase 1) and a carbonation phase (Phase 2). In particular, the vertical axis is labeled Mass. The units used to designate mass for the sample mass which includes water as well as the solid substances in the sample (designated by a solid curve) and the accumulated $CO_2$ mass (designated by a dotted curve) can have different scales. That is, the addition of $CO_2$ to a material to be cured in general represents a significantly smaller absolute mass than the mass of the material to be cured, because $CO_2$ has a molecular weight of approximately 44 atomic units, while most solids comprise multiple chemical elements such as Ca, Mg and Si that individually have atomic masses of approximately 40, 24 and 28 atomic units, respectively.

The extent and duration of Phase 1 and Phase 2 may vary depending on product formulation, the concrete raw materials, the properties of the cement and binder components, the product density, the product geometry, the use of chemical additives, and the conditions applied during the curing process.

In some embodiments, the transition from the first drying phase (Phase 1) to the second carbonation phase (Phase 2) is associated with a change in the electrical properties of the product on the surface or in the bulk. In some embodiments, one or multiple electrical properties, such as, the resistivity, conductivity, impedance, capacitance, dielectric constant, dielectric strength, permittivity, piezoelectric constant, Seebeck coefficient of the product may change.

In some other embodiments, the transition from the first drying phase (Phase 1) to the second carbonation phase (Phase 2) is associated with a change in the quantity of water is removed from the product. In some embodiments, the quantity of water removed from the product is measured through tracking the mass change of the product throughout the process in any of the first drying phases (Phase 1) or any of the second carbonation phases (Phase 2).

In some other embodiments, the transition from the first drying phase (Phase 1) to the second carbonation phase (Phase 2) is associated with a change in the rate of water removed from the product. In some embodiments, the rate at which water extracted from the product is measured, tracked and controlled throughout the process in any of the first drying phases (Phase 1) or any of the second carbonation phases (Phase 2).

In some other embodiments, the transition from the first drying phase (Phase 1) to the second carbonation phase (Phase 2) is associated with a change in the rate of water collected from the gas circulating in the chamber. In some embodiments, the rate at which water is collected from the gas circulating in the chamber is measured, tracked and controlled throughout the process in any of the first drying phases (Phase 1) or any of the second carbonation phases (Phase 2).

In some other embodiments, the transition from the first drying phase (Phase 1) to the second carbonation phase (Phase 2) is associated with a change in the $CO_2$ and/or $O_2$ concentration in the gas circulating in the chamber. In some embodiments, the $CO_2$ and/or $O_2$ concentration of the gas circulating in the chamber is measured, tracked and controlled throughout the process in any of the first drying phases (Phase 1) or any of the second carbonation phases (Phase 2).

In some other embodiments, the transition from the first drying phase (Phase 1) to the second carbonation phase (Phase 2) is associated with a change in the relative humidity of the gas circulating in the chamber. In some embodiments, the relative humidity of the gas circulating in the chamber is measured, tracked and controlled throughout the process in any of the first drying phases (Phase 1) or any of the second carbonation phases (Phase 2).

In some other embodiments, the transition from the first drying phase (Phase 1) to the second carbonation phase (Phase 2) is associated with a change in temperature of the gas circulating in the chamber. In some embodiments, the temperature of the gas circulating in the chamber is measured, tracked and controlled throughout the process in any of the first drying phases (Phase 1) or any of the second carbonation phases (Phase 2).

In some other embodiments, the transition from the first drying phase (Phase 1) to the second carbonation phase (Phase 2) is associated with a change in temperature of the gas circulating in the chamber. In some embodiments, the temperature of the gas circulating in the chamber is measured, tracked and controlled throughout the process in any of the first drying phases (Phase 1) or any of the second carbonation phases (Phase 2).

In some other embodiments, the transition from the first drying phase (Phase 1) to the second carbonation phase (Phase 2) is associated with a change in temperature of the product. In some embodiments, the temperature of the product is measured, tracked and controlled throughout the process in any of the first drying phases (Phase 1) or any of the second carbonation phases (Phase 2). In some embodiments, the change in temperature of the product is monitored using an infrared camera.

In some other embodiments, the transition from the first drying phase (Phase 1) to the second carbonation phase (Phase 2) is associated with a change in the pressure inside the chamber. In some embodiments, the pressure inside the chamber is measured, tracked and controlled throughout the process in any of the first drying phases (Phase 1) or any of the second curing phases (Phase 2).

In some other embodiments, the transition from the first drying phase (Phase 1) to the second carbonation phase (Phase 2) is associated with a change in the pH of the product. In some embodiments, the pH of the product is measured, tracked and controlled throughout the process in any of the first drying phases (Phase 1) or any of the second carbonation phases (Phase 2).

In some other embodiments, the transition from the first drying phase (Phase 1) to the second carbonation phase (Phase 2) is associated with a change in the pH of the water collected during the process from the products and subsequently from the chamber. In some embodiments, the pH of the water collected during the process from the products and subsequently from the chamber is measured, tracked and controlled throughout the process in any of the first drying phases (Phase 1) or any of the second carbonation phases (Phase 2).

In some other embodiments, the transition from the first drying phase (Phase 1) to the second carbonation phase (Phase 2) is associated with a change in the elemental composition of the product. In some embodiments, the elemental composition of the product is measured, tracked and controlled throughout the process in any of the first drying phases (Phase 1) or any of the second carbonation phases (Phase 2).

In some other embodiments, the transition from the first drying phase (Phase 1) to the second carbonation phase (Phase 2) is associated with a change in the response of the product to ultrasonic stimulation. In some embodiments, the response of the product to ultrasonic stimulation is measured, tracked and controlled throughout the process in any of the first drying phases (Phase 1) or any of the second carbonation phases (Phase 2).

In an aspect, the control of product temperature and water removal in the first drying phase (Phase 1) and the rate of reaction in the second carbonation phase (Phase 2) is controlled, and in some instances expedited, through selection of an energy source.

In some embodiments, the energy source used for heating the gas and/or the product is fossil fuel combustion.

In some embodiments, the energy source used for heating the gas and/or the product is electrical resistance heating.

In some embodiments, the energy source used for heating the gas and/or the product is an infrared heat source.

In some other embodiments, the energy source used for heating the gas and/or the product is a laser.

In some embodiments, the energy source used for heating the gas and/or the product is dielectric heating, wherein dielectric heating may employ the use of waves of microwave frequency or radio frequency. In some embodiments, the radio frequencies used is in the Industrial, Science and Medical band (ISM band).

In some other embodiments, the energy source used for heating the gas and/or the product is plasma.

In some other embodiments, the energy source used for heating the gas and/or the product is steam.

In some other embodiments, the energy source used for heating the gas and/or the product is superheated steam.

In some other embodiments, the energy source used for heating the gas and/or the product is conduction.

In some other embodiments, the energy source used for heating the gas and/or the product is a radiator.

In some other embodiments, the energy source used for heating the gas and/or the product is a radiation heat source.

In some other embodiments, the energy source used for heating the gas and/or the product is a heat source such as co-generation facility.

In some other embodiments, the energy source used for heating the gas and/or the product includes a combination of the heat sources described above.

In an aspect, the control of the water removal in the first drying phase (Phase 1) and/or the rate of reaction in the second carbonation phase (Phase 2) is controlled, and in some instances expedited, through control of the water extraction from the product and subsequently from the gas in the chamber.

In some embodiments, the water extraction from the product and subsequently from the chamber is controlled through natural convection.

In some embodiments, the water extraction from the product and subsequently from the chamber is controlled through forced convection.

In some embodiments, the water extraction from the product and subsequently from the chamber is controlled through a compressor.

In some embodiments, the water extraction from the product and subsequently from the chamber is controlled through a desiccant.

In some embodiments, the water extraction from the product and subsequently from the chamber is controlled through a heat exchanger/chiller.

In some embodiments, the water extraction from the product and subsequently from the chamber is controlled through the use of lower than atmospheric pressure regimes including but not limited to vacuum.

In some other embodiments, the water extraction from the product and subsequently from the chamber is controlled through the use of a combination of processes described above.

In an aspect, the control of the water removal in the first drying phase (Phase 1) and/or the rate of reaction in the second carbonation phase (Phase 2) is controlled, and in some instances expedited, through control of the circulation of the gas in the chamber. In some embodiments, the velocity of the gas local to the products is controlled through adjusting the flow of the gas in the chamber.

In some embodiments the flow of the gas is controlled using an engineered plenum.

In some embodiments the flow of the gas and the velocity of gas over the products are controlled using an internal circulation system. In some embodiments the engineered internal circulation inside the chamber comprises of fans that move the gas inside the chamber.

In some embodiments the flow of the gas is controlled using an external circulation system. In some embodiments the engineered external circulation system comprises of fans that move the gas between the interior and exterior of the chamber.

In some embodiments the flow of the gas is controlled using an internal circulation system and an external circulation system in tandem. In some embodiments the flow of gas is proportioned between the internal circulation system and the external circulation system by means of a bypass.

In some embodiments a curing system comprises multiple internal circulation systems, external circulation systems, heaters, and dehumidification systems may be affixed to one chamber providing multiple independent control zones within the chamber.

In an aspect, the efficiency of $CO_2$ consumption during the curing process is maximized by adjusting the $CO_2$ concentration at the end of the carbonation phase (Phase 2) and/or the final drying phase. More specifically, the $CO_2$ concentration is allowed to drop in the chamber during the carbonation phases as the $CO_2$ uptake rate by the product decreases. This assists with the conservation of the $CO_2$, which is essential from both a cost and an environmental consideration.

Example 1

A curing method utilizing alternating cycles of increasing and decreasing evaporation rates was used to achieve comparable strengths of carbonatable calcium silicate cement concrete pavers in a shorter run time than a run based on strictly constant drying conditions.
Methodology A curing chamber was loaded with carbonatable calcium silicate cement concrete pavers. Previous measurements indicated a distribution of relative evaporation rates throughout the chamber. Electrical resistance sensors were placed on the surfaces of products at locations known to have relatively high and relatively low evaporation rates.

The curing process commenced by introducing $CO_2$ to the chamber and gas conditioning system until a high concentration was reached. Next, flow, heat, and system dehumidification were adjusted to reach a desired temperature and relative humidity. The chamber reached 60° C. in 2.5 hours and the relative humidity was maintained at or below 60%.

At the 2.5 hour mark, the evaporation rate in chamber was reduced. Reduction of the drying conditions was achieved by: stopping the heater and, and stopping the gas circulation system. This decreased evaporation rate condition was maintained for 30 minutes before the standard drying conditions were reestablished by restarting the heater and gas circulation system. The original evaporation conditions were then maintained for 1 hour before beginning another cycle of reduction in drying conditions. The exact timing of the transitions between the normal evaporation and decreased evaporation regimes was determined by monitoring the electrical resistance of the product surfaces. A total of four cycles of were completed before the system entered an intense drying step of 65° C., high gas flow/velocity, and very low relative humidity. The total duration of the curing process was 13 hours.

The curing process utilized was developed in order to help unify the moisture removal levels throughout the product in the chamber. By reducing the internal recirculation velocity, the evaporation rate at the surface of the products is diminished. This provides an opportunity for water to transport from the interior of the product to the exterior of the product, thus reducing the moisture gradient within each product. By introducing such stalling processes certain products that could develop an unfavorable steep moisture gradient during phase 1 drying due to relatively high local evaporation rates can instead be dried in a manner where a favorable shallow moisture gradient is created by the end of phase 1 drying.

Figure 3:
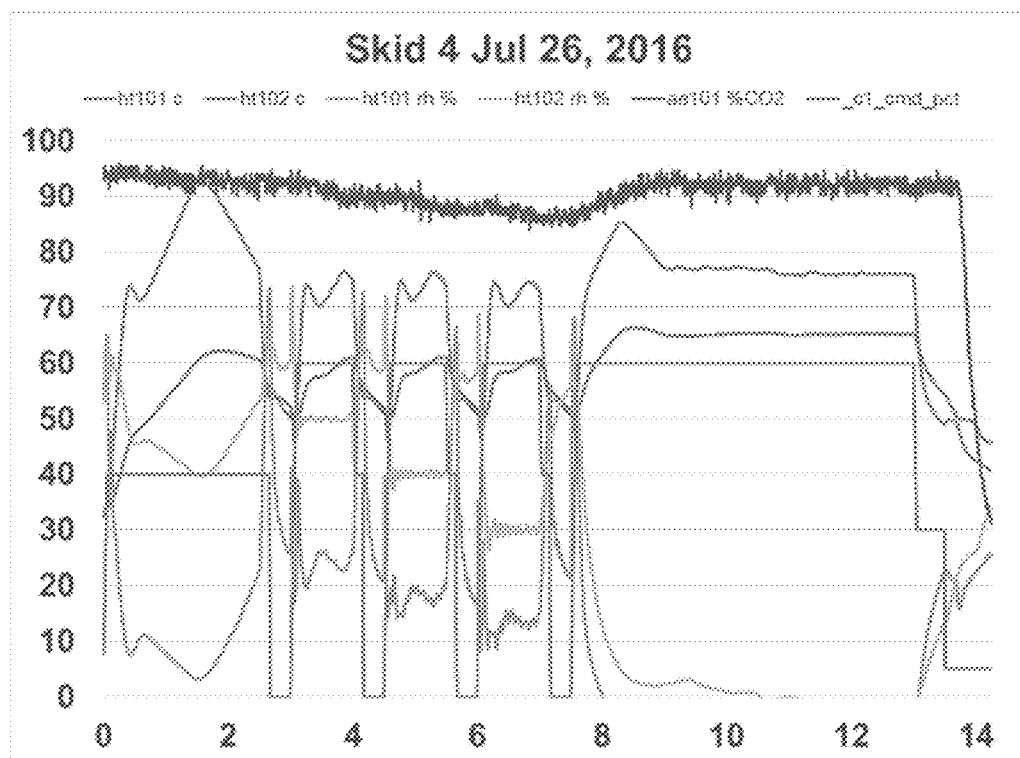
FIG. 3 shows the mass and $CO_2$ uptake of a sample during curing which illustrates the separate Phase 1 drying and Phase 2 carbonation.

Experimental data is shown in FIG. 3.

Example 2

Carbonatable calcium silicate cement based concrete cylinders were produced to study a curing process including phase 1 drying in the absence of $CO_2$. The mixture proportions used for production of fresh concrete is shown in Table 1. The fresh properties of concrete produced using the materials as per quantities in Table 1 are shown in Table 2.

TABLE 1

The mixture proportions of the concrete produced for Example 2.

| Component | Mass | Batch quantity, kg | $kg/m^3$ or $l/m^3$ |
|---|---|---|---|
| Carbonatable calcium silicate cement | 17.3% | 13.90 | 415.4 |
| Const. sand | 38.1% | 31.91 | 915.8 |
| ¼" aggregates | 24.3% | 19.48 | 582.3 |
| ⅜" aggregates | 20.3% | 16.21 | 484.5 |
| water-reducing admixture | 5 | 0.073 | 2.07 |
| set-retarding admixture | 7 | 0.0973 | 2.90 |
| Water | 5.50% | 4.68 | 139.5 |

TABLE 2

The fresh properties of the concrete produced for Example 2.

| Parameter | Value |
|---|---|
| Slump, mm (inches) | 38.1 (1.5) |
| Air content, % | 5.0 |
| Unit weight, $kg/m^3$ (lb/cft) | 2374.26 (148.22) |

Figure 4A:
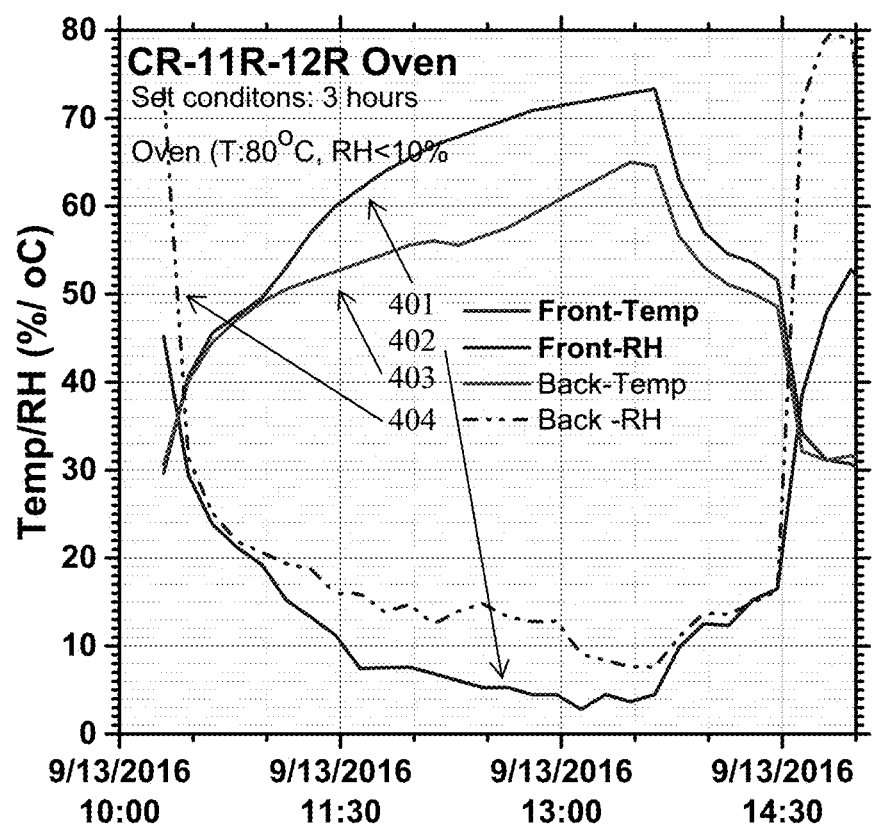
FIG. 4A illustrates the sample temperature and RH profile during phase I drying in curing Example 2.
Figure 4B:
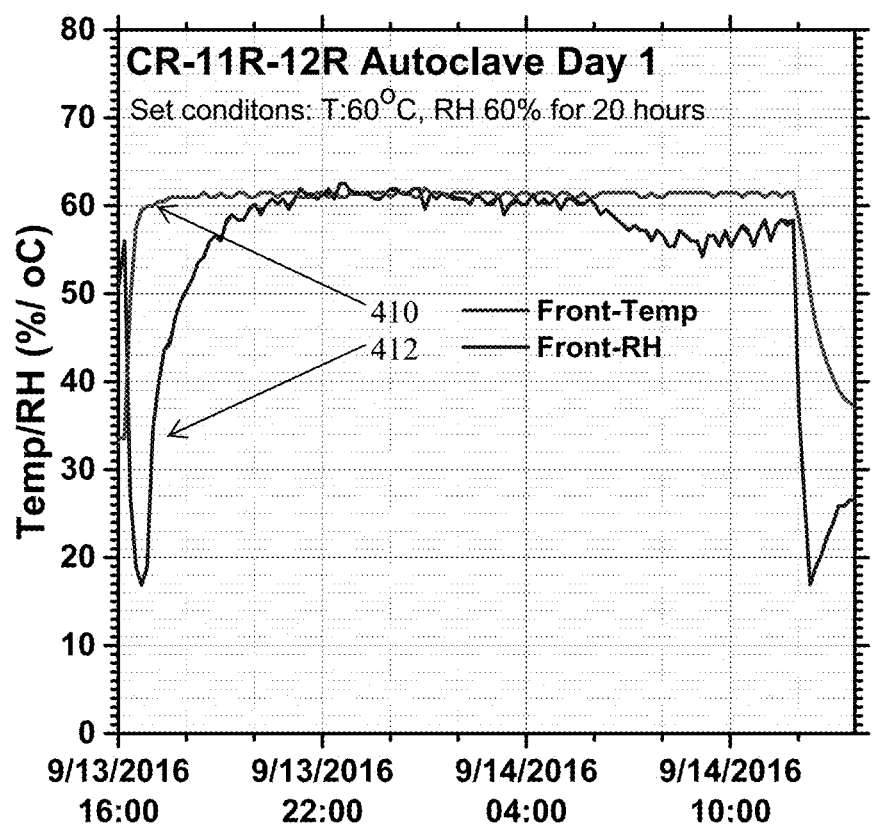
FIG. 4B illustrates the sample temperature and RH profile during phase II carbonation in curing Example 2.
Figure 4C:
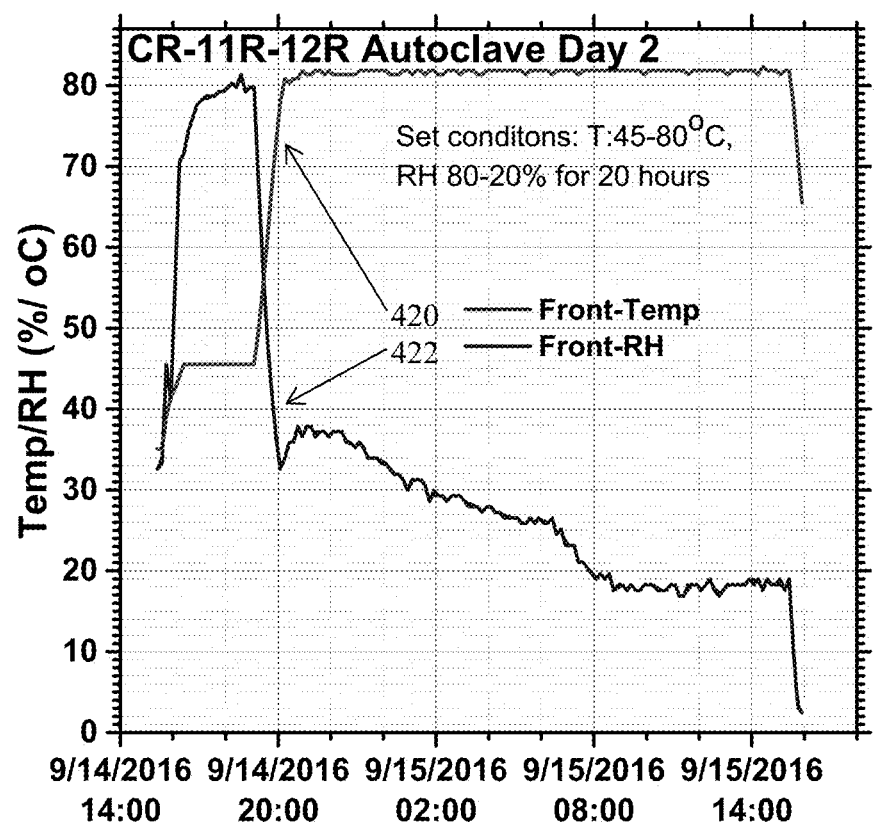
FIG. 4C illustrates the sample temperature and RH profile during phase III carbonation in curing Example 2.

The mixing procedure used to produce the concrete was as below.
1) Add all of the coarse aggregates into the mixer.
2) Add all sand into the mixer to produce the dry aggregate mix.
3) Mix the dry mix for 30 seconds.
4) Add 50% of the mixing water to produce the wet aggregate mix.
5) Add cement into the mixer to produce the wet concrete mix.
6) Add set retarding admixtures, such as but not limited to, Sika Plastiment into the mixer and mix it for 30 seconds.
7) Add remaining 50% of the mixing water and mix for 30 seconds.
8) Add water reducing admixture, such as but not limited to, Glenium 7500 and mix for 3 minutes.
9) Rest the mixer for 1 minute.
10) Measure Slump of the fresh concrete.
11) Measure the unit weight and air content of the fresh concrete.
12) 16 4×8" Cylinders are cast with the fresh concrete mix in 2-3 layers with about 30 seconds of vibration for each layer.
13) Put the concrete specimens in an oven with temperature set at 80° C. for 3 hours (FIG. 4A).
14) Remove the specimens from the oven after 3 hours of oven drying and cool at ambient conditions for 1 hour.
15) Weigh the specimens to calculate the amount of moisture lost during the drying state (Phase 1).
16) Demold the specimens and put them in a curing chamber for carbonation (Phase 2) at 60° C. and 60% RH for 20 hours with >95% $CO_2$ gas concentration. (FIG. 4B).
17) The specimens were further carbonated (continuation of Phase 2) at 80° C. and 30% RH for 20 hours with >95% $CO_2$ gas concentration. (FIG. 4C).

The average compressive strength for cured concretes (4×8" cylinders) after 40 hours of carbonation was observed to be 9388 psi.

Example 3

The mixture proportions used for the production of a wet-cast concrete product for example 3 are shown in Table 3. The concrete was prepared by dry-mixing cement and aggregates, then introducing water and aggregates, and finally wet-mixing the entire batch. Fresh concrete was tested for spread, unit weight, air content and tendency to segregate. Fresh mix yielded unit weight of 144 lb/ft$^3$, air content of 7% and spread of 20 inches. The mix did not segregate. The concrete was poured directly into 24"×24"×1.5", 24"×18"×1.5" and 24"×12"×1.5" ABS plastic mold cavity and briefly consolidated via gentle tapping of the mold.

TABLE 3

Mixture proportions of the concrete produced for example 3.

| Component | Proportion (lb/ft$^3$) |
|---|---|
| Carbonatable calcium silicate cement | 645 lb/ft$^3$ |
| Slag | 270 lb/ft$^3$ |
| ¼" (—) Trap Rock | 1647 lb/ft$^3$ |
| Sahara Concrete Sand | 1007 lb/ft$^3$ |
| Water | 321 lb/ft$^3$ |
| Water repelling admixture | 0.4 oz/lb cementitious |
| Water reducing admixture | 6 oz/lb cementitious |
| Set retarding admixture | 3 oz/lb cementitious |

The ABS mold containing the wet cast specimen was loaded into a curing chamber. Two curing processes were investigated. The duration of each investigated curing process was 14 hours.

In curing process A, the curing chamber was purged to achieve a high $CO_2$ concentration (>90%). The heater and gas circulation system were controlled to achieve a temperature of 60° C. and a relative humidity of 25% or lower. The electrical resistance of the product surface was monitored. The curing ran for 14 hours. The electrical resistance of the product surface was observed to depart from the electrical resistance of the green concrete body at hour 4. The change in electrical resistance of the product surface indicated a transition between a drying-dominant phase to a carbonation-dominant phase.

In curing process B, the curing recipe was modified so that the evaporation rate of the sample was reduced during the carbonation phase in order to enhance the extent of the carbonation curing. First, the curing chamber was purged to achieve a high $CO_2$ concentration (>90%). The heater and gas circulation system were controlled to achieve a temperature of 60° C. and a relative humidity of 25% or lower. After 4 hours, as indicated by the change in electrical resistance of the product surface, the gas circulation settings were modified to create a high humidity in the chamber and thus reduce the evaporation rate for three hours. Following this low evaporation rate step, the gas circulation system settings were modified to gradually increase the evaporation rate by capping the chamber relative humidity at 50% for two hours. Following this the gas circulation system and heater settings were modified to increase the gas temperature 70° C. and cap the chamber relative humidity at 25% for the remainder of the run.

Figure 5A:
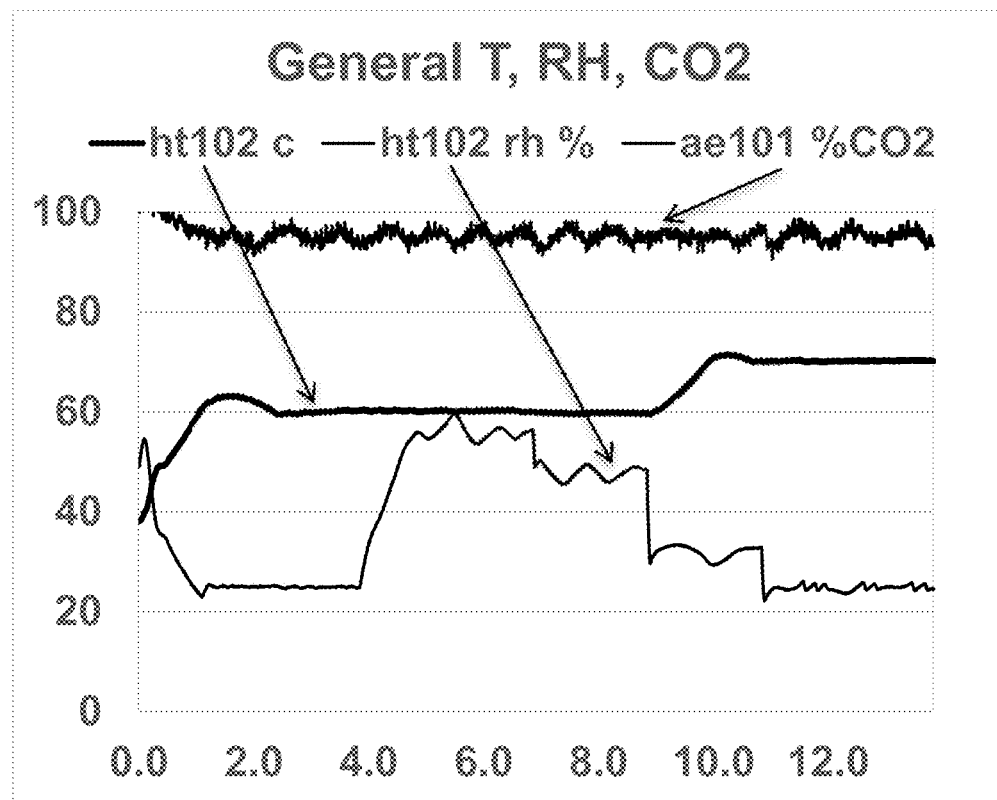
FIG. 5A is a graph illustrating a system curing profile in curing Example 3.
Figure 5B:
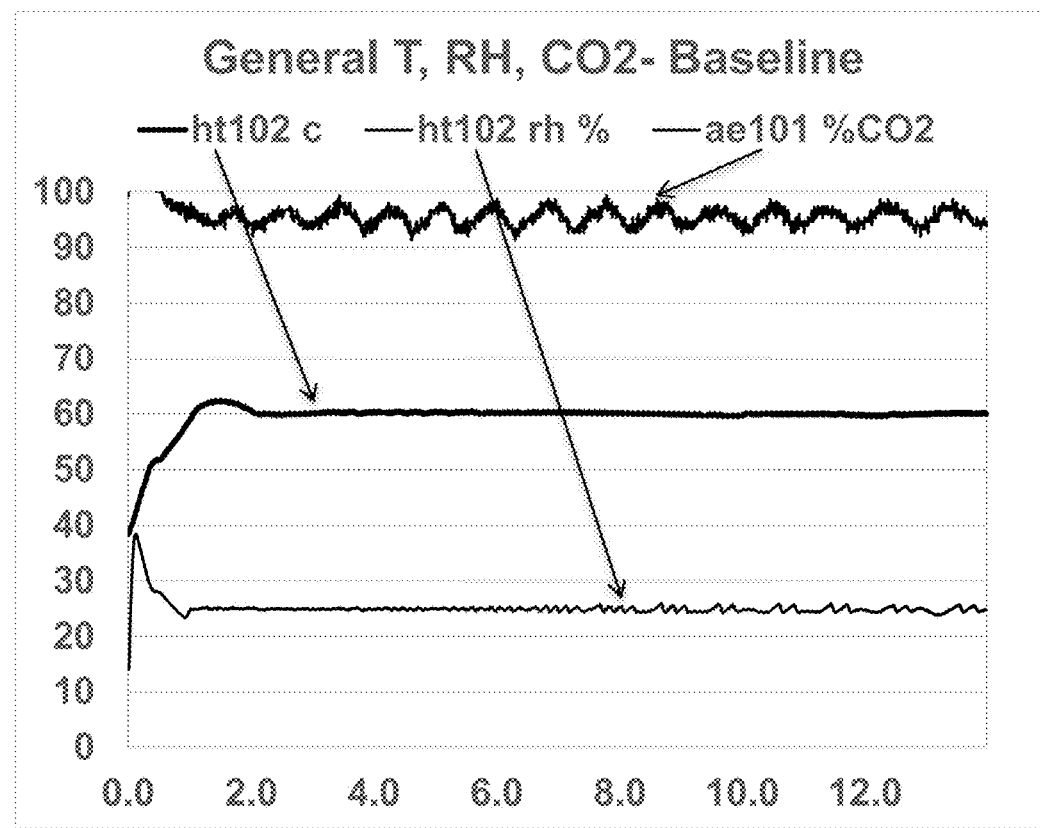
FIG. 5B is a graph illustrating a system curing profile in curing Example 3.
Figure 5C:
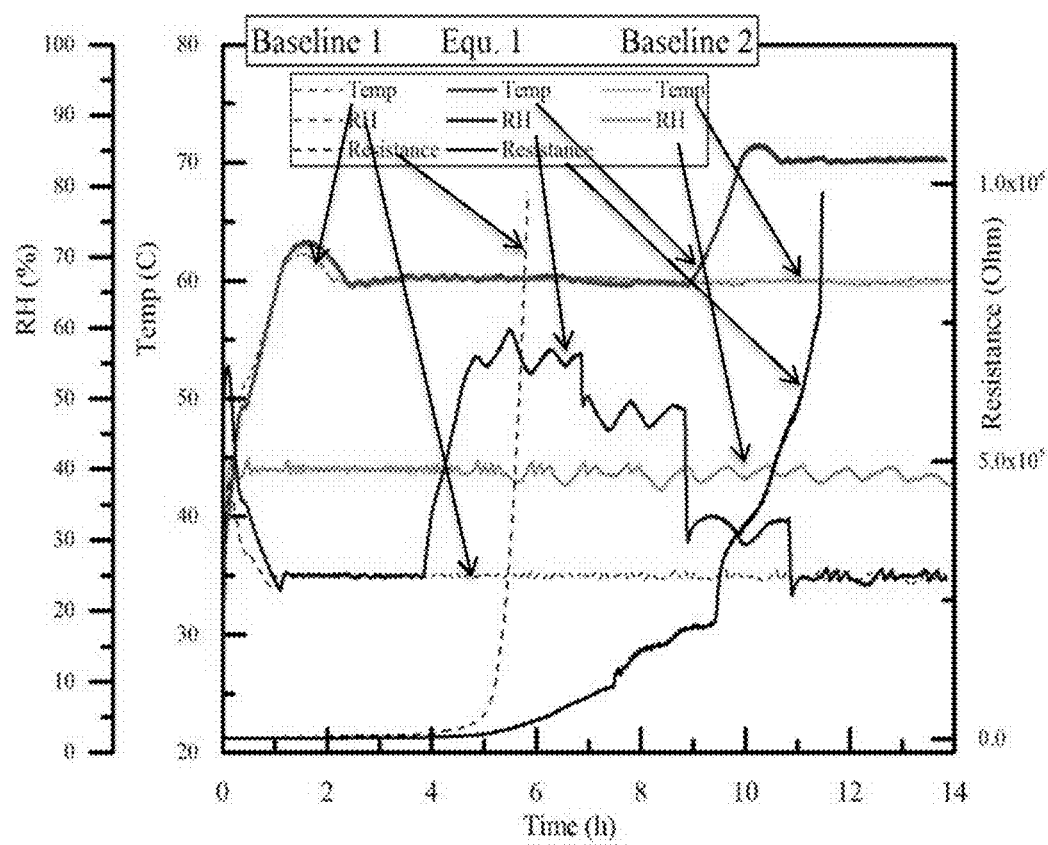
FIG. 5C is a graph illustrating sample surface resistance data and system curing profiles for curing Example 3.

The chamber temperature, chamber relative humidity, and the electrical resistance of the sample surface for curing process A and curing process B are illustrated in FIG. 5C.

The flexural strength of the products cured during process A and process B was measured. The products were also cut in half in order to ascertain if they had carbonated uniformly. The product cured using process A had a flexural strength of 620 psi and was observed to possess a weak, poorly carbonated region in its center. The product cured using process B had a flexural strength of 789 psi and observed to be strong and carbonated through its entire thickness. The result of this test provides evidence that reducing the evaporation rate during the carbonation phase of the concrete curing process can enhance the curing process.

Radio Frequency Curing:

Example 4

Several carbonatable calcium silicate cement based pavers were placed on an RF compatible board with various temperature sensors in place. The samples were loaded into the RF system and brought to a temperature of 60° C. for 5 min, then 70° C. for 10 min, and then to 90° C. for 10 min. All temperatures were monitored over time and visual observations were also made. At the end of the 25 minute test, multiple samples were taken from various locations for moisture analysis.

All carbonatable calcium silicate cement based pavers heated and dried effectively. The internal and external temperatures were both +/−5 degrees Celsius. The discrepancy between measured moisture content from center to top on a single paver was between 0.25% and 1.05%.

Example 5

8 carbonatable calcium silicate cement based pavers were loaded into the RF system in 4 separate RF compatible bins. $CO_2$ was flowed slowly into the bottom corner of the bins and out the top on the opposite side. The samples were brought up to 60° C. with RF over approximately 10 min and held for 1 hour before testing the first sample (1300 W for 10 minutes to get to 60° C., then ~12 W/paver to maintain 60° C.). A sample was pulled and tested every half an hour, then returned to the $CO_2$ environment in the RF system. For the last half hour the sample temperature was brought to 85° C. The total $CO_2$ exposure time was 5 hours. One sample was broken in half and appeared hard and carbonated throughout.

It is possible to cure pavers inside of a Radio Frequency based curing system and it can be done in a short timeframe.

Example 6

8 carbonatable calcium silicate cement based pavers were placed into the RF system with temperature sensors embedded in them and the temperature was brought up to 85° C.

The internal paver temperature reached 60° C. in 1 minute and 85° C. in 2 minutes.

Example 7

Carbonatable calcium silicate cement based cement pavers were placed into the RF system with temperature sensors embedded in them and brought to 85° C. in 2 minutes. Samples were removed, moisture content was measured, and water distribution was observed. Several iterations of this experiment were run making minor adjustments to the machine.

The samples measured moisture content indicated that they lost between 30% and 50% of their moisture within two minutes of RF exposure.

Example 8

8 carbonatable calcium silicate cement based pavers were loaded into the RF system in 4 separate RF compatible bins.

Temperature sensors were embedded into samples in each bin. $CO_2$ was flowed slowly into the bottom corner of the bins and out the top on the opposite side. The samples were brought up to 85° C. in approximately 3 min and 50 seconds and held for 3 hours (8 kW for 3 min 50 sec to get to 85° C., then ~200 W or 25 W/paver to maintain 85° C.).

The centers of the pavers were extremely hard, while the surface and corners were somewhat soft. This result provides evidence that further optimization and development of the RF based curing system could yield extremely fast curing times.

Example 9

8 carbonatable calcium silicate cement based pavers were placed into the RF system with temperature sensors embedded in 2 of them and the temperature was brought up to 85° C. in 2 minutes. Samples were removed, half of them were sprayed with water to re-wet the surface and half of them were not. The two sets of 4 samples were then placed into plastic containers with heated $CO_2$ flowing slowly into the bottom corner and out the top. After 3 hours a sample was pulled from each container, broken in half and inspected, one additional was removed from each container and put aside. The samples that were not re-wet appeared to be cured in the center, but the surface and corners appeared to be soft and dusty. The re-wet samples had a hard surface and also appeared to be cured in the center.

Carbonatable calcium silicate cement based pavers can be heated and dried using Radio Frequency and then cured in a $CO_2$ environment without the use of Radio Frequency. Using Radio Frequency only during the first heat-up and drying phase of the process can still reduce the total process time significantly. Re-wetting of the surface appeared to be beneficial after a very rapid heat up phase.

Water Removal

Figure 6:
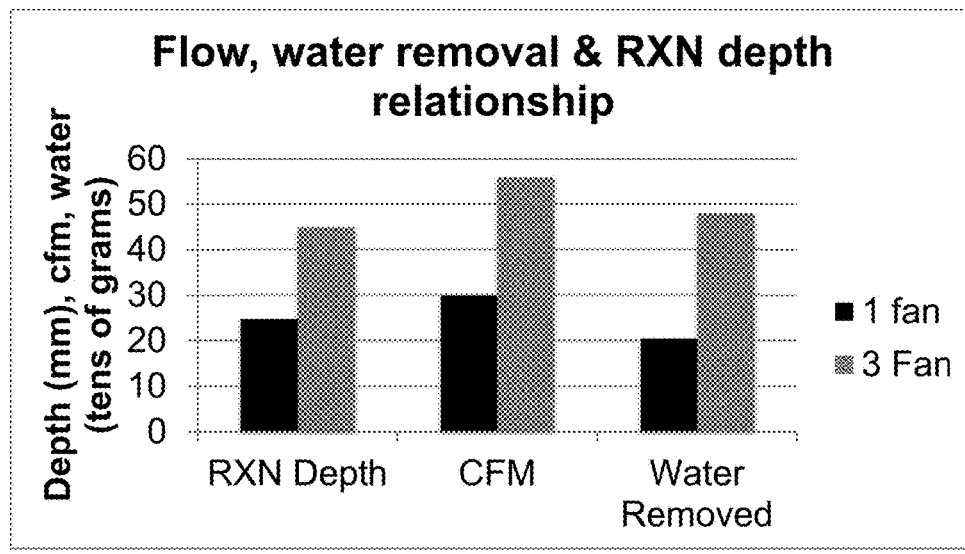
FIG. 6 is a graph that illustrates the differences in reaction depth, gas flow in cubic feet per minute and amount of water removed from specimens of $CO_2$ Composite Material cured in systems using 1 fan and 3 fans.

FIG. 6 is a graph that illustrates the differences in reaction depth, gas flow in cubic feet per minute and amount of water removed from specimens of $CO_2$ Composite Material cured in systems using 1 fan and 3 fans. It is apparent that reaction depth, gas flow in cubic feet per minute and amount of water removed from specimens of $CO_2$ Composite Material all increase when more capacity to move the reactive gas is provided.

Figure 7:
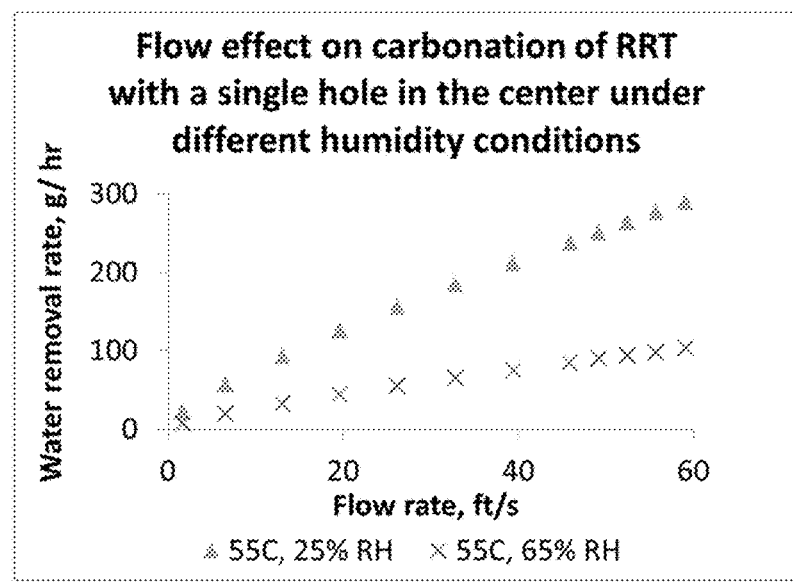
FIG. 7 is a graph showing data for water removal rate as a function of flow rate for gases having different relative humidity.

FIG. 7 is a graph showing data for water removal rate as a function of flow rate for gases having different relative humidity. As is seen in FIG. 7, using a higher flow rate and a lower relative humidity tends to increase the rate at which water is removed from the sample. It is believed that the reaction of CCM with $CO_2$ occurs preferentially at the interface where water-saturated CCM is in contact with gaseous $CO_2$, so more rapid removal of water correlates with faster rates of cure.

Figure 8:
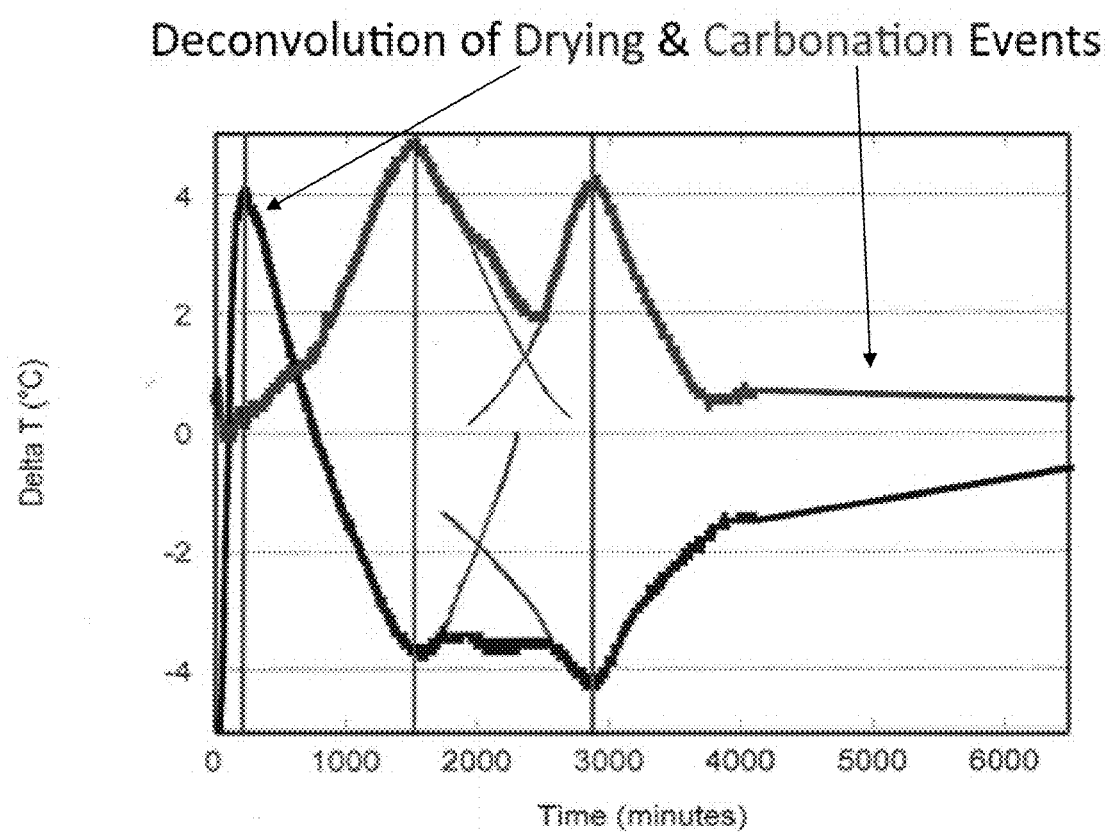
FIG. 8 is a graph showing the calculated temperature behavior with time for drying alone and for carbonation alone, obtained by de-convolution.

FIG. 8 is a graph showing the calculated temperature behavior with time for drying alone and for carbonation alone, obtained by de-convolution, as explained in U.S. Ser. No. 14/602,313, which has been incorporated by reference herein. FIG. 8 includes a comparison of the carbonation exotherm with the drying endotherm plotted on the same time scale. FIG. 8 indicates that drying can be used to control reaction speed and extent.

It emerges that during curing a drying front establishes itself and moves from the outside of the formed object toward its interior. A reaction front also forms almost coincident with the drying front. The curing reaction can only occur near the drying front/reaction front because $CO_2$ is supplied as a gas and is not present initially in the water at any significant concentration. In front of the drying front (e.g., on the wet side of the front) water is present in the pores, which inhibits $CO_2$ diffusion. Behind the front (e.g., on the dry side of the front) the pores contain too little water to support carbonation, but $CO_2$ can diffuse quickly to the region of the front and water can diffuse from the front back to the surface of the formed body. If these fronts move quickly through a region of the formed body the extent of reaction will be lower than if the fronts move slowly compared to the intrinsic rate of chemical reaction. The shape of the drying front will depend on the external shape of the formed body, the relative drying rates through its external surfaces and the diffusion distances from the front to the surface of the formed body.

Additional Material

U.S. Pat. No. 9,266,147 is incorporated by reference herein in its entirety.

In fluids, diffusional processes rate-limit a process when the thickness through which diffusion must occur is greater than the diffusion distance, which can be estimated by computation of root mean square displacement. For example, for a fluid with no convection, the diffusion of ions at room temperature and atmospheric pressure in water is approximately 0.19 cm. There are many applications where thicknesses of materials exceed this length scale. In these cases, mechanical convection of the fluid by any suitable means known to one of skill in the art is necessary. Another alternative is to introduce the solvent or reactive species as a gaseous species. When this is done, the diffusion distance increases to 9 cm. In further embodiments, supercritical conditions can be employed to achieve transport rates that lie between liquids and gases.

Figure 9:
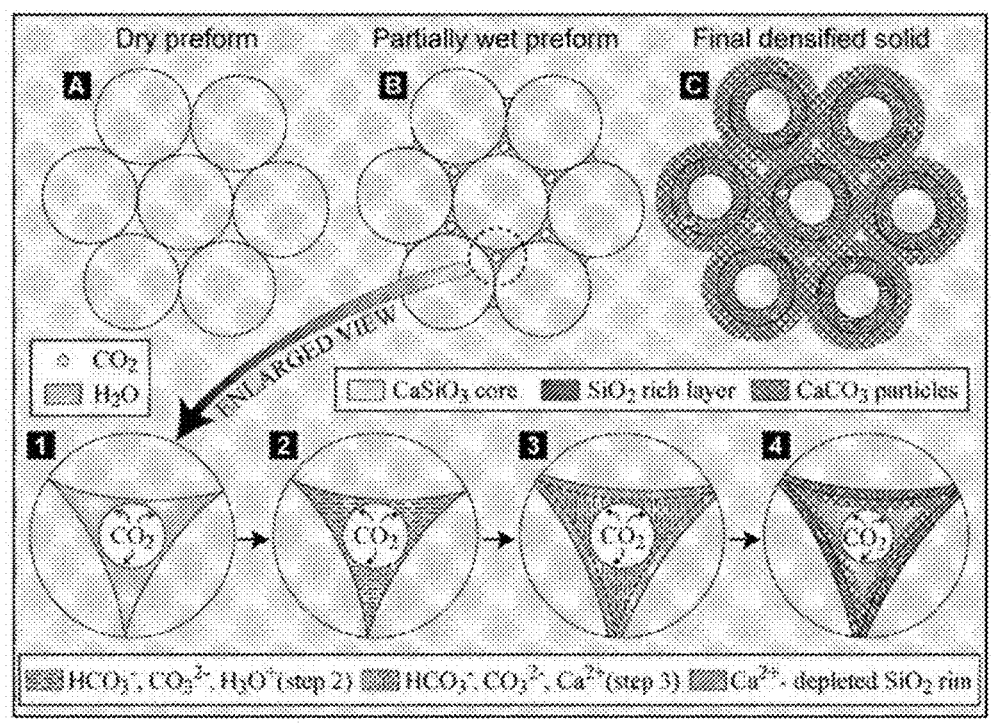
FIGS. 9 through 12 are part of the prior art description found in U.S. Pat. No. 9,266,147, issued Feb. 23, 2016 as FIGS. 1-4 therein.

FIG. 9 represents g-rHLPD process Schematic. A—Dried porous $CaSiO_3$ preform; B—Partially wet $CaSiO_3$ preform; C—Final densified monolithic solid. Steps 1 to 4 represent the carbonation-densification process occurring in an individual pore: Step 1—Partially wet pore with $CO_2$; Step 2—Diffusion, dissolution and dissociation of $CO_2$; Step 3—Dissolution of $CaSiO_3$ by hydrogen ions; Step 4—Precipitation of solids. After the completion of step 4, the process takes place continuously following steps 2-4 until various kinetic factors slow down the process (e.g., thick $CO_2$ reaction layers).

For mineral silicate carbonation reactions to proceed quickly, the concept of gas-assisted HLPS or in other words, gas-assisted hydrothermal liquid phase densification, rHLPD (FIG. 9). g-rHLPD utilizes partially infiltrated pore space so as to enable gaseous diffusion to rapidly infiltrate the porous preform and saturate thin liquid interfacial solvent films in the pores with dissolved $CO_2$. $CO_2$-based species have low solubility in pure water (1.5 g/L at 25° C., 1 atm). Thus, a substantial quantity of $CO_2$ must be continuously supplied to and distributed throughout the porous preform to enable significant carbonate conversion. Utilizing gas phase diffusion offers a 100-fold increase in diffusion length over that of diffusing soluble $CO_2$ an equivalent time in a liquid phase. This partially infiltrated state enables the reaction to proceed to a high degree of carbonation in a fixed period of time. For example, in the partially infiltrated state, 47.5±2.7 mol % conversion of $CaSiO_3$ into $CaCO_3$ and $SiO_2$ can be achieved in ~19 h at a temperature of 90° C. and a pressure of 2.36 atm. If all the same reaction conditions are maintained except that the pores are completely filled with water, a substantially lower carbonation conversion, 3.8±0.5 mol %, results.

This work differs from published work, where no attention was paid to (1) the choice of water concentration relative to the degree of pore saturation (DPS) in the porous body throughout the porous preform both before and during reaction (e.g., in this case, carbonation) and (2) the methodology for how the water was delivered to the porous body. Instead, prior art used arbitrary amounts of residual water during the preparation of the porous preform, failing to recognize the importance of DPS and performed subsequent treatment in an autoclave containing $CO_2$ and water vapor without identifying optimum methods of water delivery during the reaction that maintain the DPS value at ones less than 100%. Controlling the water concentration and its method of delivery into the porous preform during LTS significantly influences the carbonation kinetics. To demonstrate this and the concept of practicing the DPS concepts to find conditions of enhanced reactivity and reaction yield (high fraction reacted), samples were reacted in a container made from a micro-porous Gore-Tex™ layer. Gore-Tex™ only allows water vapor species to and from the sample in a water-saturated atmosphere where the $CO_2$ activity is fixed at a pressure of 2.36 atm and a temperature of 90° C. A pool of water sets below the sample to saturate the atmosphere and co-exist with the water vapor in the reaction throughout the duration of the reaction. Thus, the chosen water content in the porous matrix is fixed by the equilibrating water vapor and no evaporation occurs in the porous matrix. Instead, the porous matrix redistributes the water in the matrix homogenously using capillary flow with no mass loss. For 19 h reactions, [when the DPS is increased from 0 to 60 vol %.], the degree of carbonation varies from 31.3 mol % to a maximum level of 49.6 mol % beyond this value, the degree of carbonation drops to 35.6 mol % when the DPS is increased to 80% and to 3.8 mol % when the DPS is 100%. These data demonstrate that optimum amounts of liquid water in the pores speeds up the reaction yield and rate because it is essential for ionization of both carbonic acid and calcium species. However, infiltrate solution levels need to be low enough such that $CO_2$ gas can diffuse into the porous matrix by gaseous diffusion prior to dissolution and diffusion in the pore-bound in water phase to the porous matrix solid/liquid interface. This is all schematically shown in FIG. 9.

Referring back to FIG. 9, the particle size distribution is monodisperse, while in many practical cases the particle size is polydisperse and the packing of the particles could adopt a wide variety of configurations that include hierarchic structures where the packing configurations repeat at each hierarchic level or change at each level. It is also conceivable that the packing structure can have long-range order, short-range order or adopt a random level of order at every length scale, whether the length scale is small, medium or large. Alternatively, short-range order may only persist on small length scale and random on the medium and large length scales. It is also possible that particles can pack with random order scale on the short length scale but then these regions of random order could be periodically distributed on the large length scale. From these examples, it is clear that particles can pack in many different configurations and the permutations are nearly infinite. Thus, there is no purpose to define all the possibilities. Accepting that the permutations are nearly infinite, it is conceivable that the packing density can vary from a small value that could be as high as 99 vol % with ordered hierarchic packing that repeats at large, medium and small length scales. Alternatively, the packing density could be as low as 0.04 vol % when the packing structure is characteristic of an aerogel, with fractal or dendritic packing in of particle or inorganic polymer in the porous matrix.

Given that the packing density can vary over a wide range, the amount of water required to saturate the pores with 99 vol % packing is a very small amount of water while the amount required to saturate pores with 0.04 vol % is a very large amount. Thus, if the requirement is to maintain open porosity to enable a rapid reaction between the gas phase and the water and the water and the solid phase, then it is conceivable to one of ordinary skill that the optimum amount of water to enable a fast reaction will be different for each system.

While it is useful to know the amount of porosity in the system, the amount of water required is also dependent on the sizes of the pores, shapes of the pores, the tortuosity of the pores and whether any of the pores happen to be closed pores. Closed pores will not provide reactive sites for the infiltrating solution unless it is transformed to an open pore by the ensuing reaction that dissolves significant portions of the porous matrix. In addition, the above discussion assumes the porous structure is uniform. However, if the pore structure is not uniform, then the optimum concentration of the water depends on the region of heterogeneous structure being saturated with water. That being said, considering a system that has polydisperse pores, it is conceivable that an infiltrating solution can completely fill the small pores while maintaining the larger pores as partially filled. Such a situation is acceptable, provided that the open pores are within reasonable proximity of the filled ones. The exact distance of proximity cannot be precisely defined because the distance depends on temperature, pressure and composition of the gas, infiltrating solution, and porous matrix.

The above discussion demonstrates that it is impossible to specify a precise amount of water (e.g., solvent) required for optimizing the speed of the reaction because of the infinite ways that porosity can be described. Thus optimum water concentrations could be 1 vol % (DPS=20%) when the packing density is 95 vol % but could be 24 vol % (DPS=63%) when the packing density is 62 vol %. It is conceivable that methods to predict the right porosity will be possible with detailed knowledge of the porosity, pore size distribution, pore shape, tortuosity, fraction of open to closed pores in the matrix and the uniformity of the various types or pores on all length scales for the object being reacted. Thus, an important aspect of this invention is the recognition that the optimum water concentration can in fact vary over a very wide range of water concentration whenever it is important for a gas to convect or diffuse into a pore structure, dissolve and react with the solvent and subsequently react with the porous matrix.

Another important point of this invention is to recognize that there are different ways to distribute water in the porous matrix, as mentioned in this specification. For instance, if a fully saturated porous compact is saturated with water, drying could be used to create open pores. However, the pores in this structure have different DPS values as you travel from the outer surface to the inner bulk of the porous matrix. In the outer surface, pores will contain no water but as you move inward into the structure, pores are partially filled and as you move further into the structure the pores are completely filled. This structure clearly has a large gradient in DPS value and thus, the rate of reaction in this structure will vary from the outside of the structure towards the inside of the structure, assuming the gradient DPS structure remains static. However, the drying step is immediately ceased and the relative humidity is adjusted to the equilibrium value such that water loss from the porous matrix ceases, capillarity will drive the filled pores to empty into the partially filled ones and the partially filled pores will partially fill the empty pores where the entire structure will have a much more uniform distribution of water. Such a situation is one where the non-uniform system will not react as fast as the uniform one because more reaction sites are available in the uniform one due to all the pores being accessible. Thus, this example shows how the distribution of water in the porous matrix is equally important. Thus, in addition to the method of addition of the infiltrate solution components, (solvent, reactive species) the optimum concentration of water also depends on whether the porous structure is maintained as homogeneous or inhomogeneous. Thus, in any situation where the optimum concentration of water must be specified, a description of the homogeneity is important towards developing an understanding of why a certain concentration of water yields the fastest reaction rate, as well as how to reproduce that very same set of conditions each time a densification reaction is performed. It is also important to point out that in situations where distribution of the solvent or in other words, water is not distributed uniformly, processes such as annealing can be performed to redistribute the water. For water, this is best to do in a controlled humidity environment so no water evaporates from the sample. Instead, the water simply flows into open pores to balance the capillary forces of fluid between the various pores in the matrix.

Figure 10:
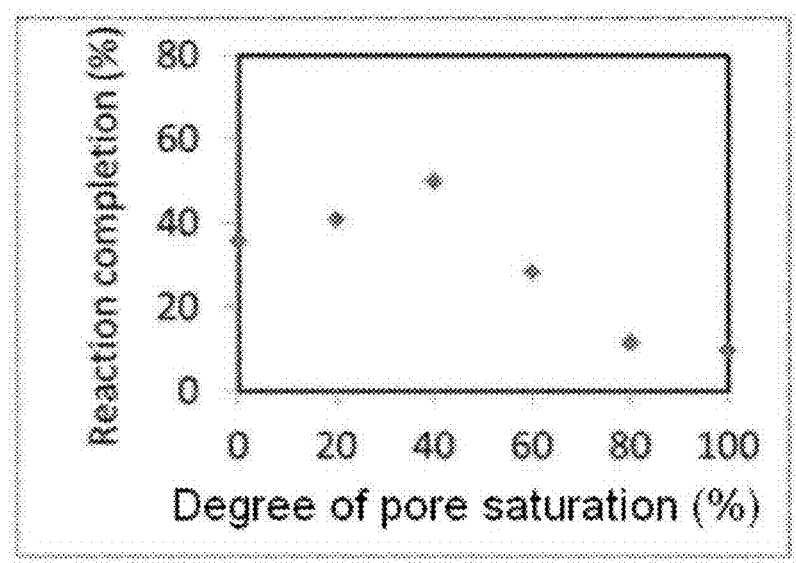
Figure 11:
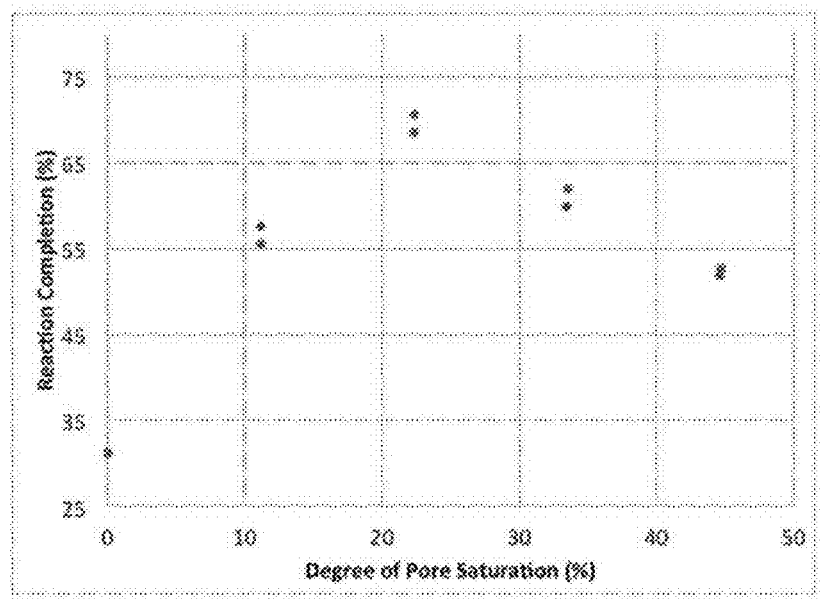
Figure 12:
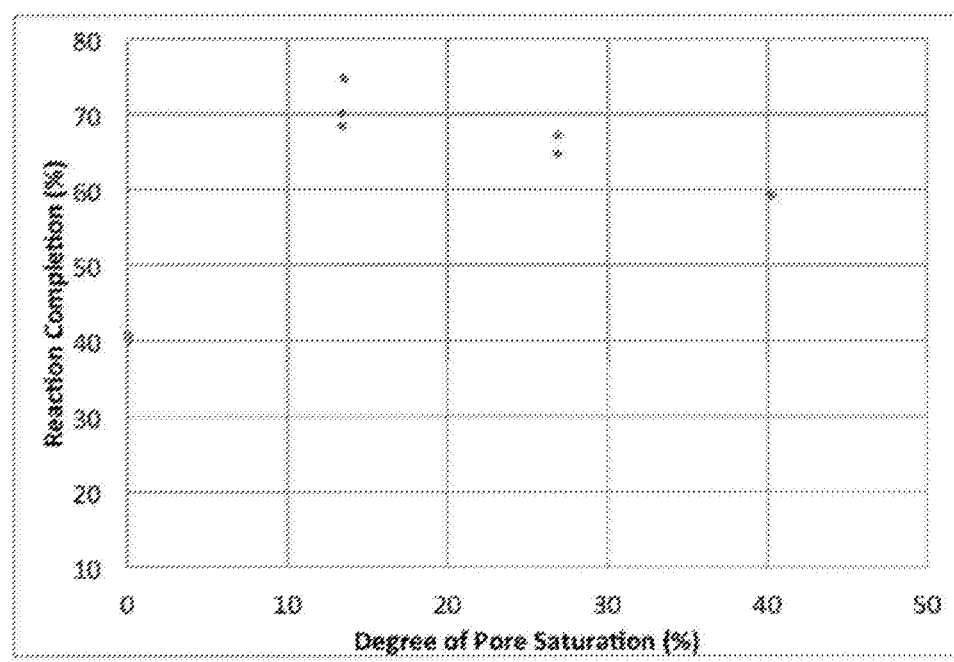

FIGS. 10-12 are three examples of how carbonation reactions involving $CO_2$ as a gas phase and liquid water in the pore structure exhibit an optimum DPS value to maximize the degree of carbonation of a given $CaSiO_3$ binder.

g-rHLPD utilizes partially infiltrated pore space so as to enable gaseous diffusion to rapidly infiltrate the porous preform and saturate thin liquid interfacial solvent films in the pores with dissolved $CO_2$. $CO_2$-based species have low solubility in pure water (1.5 g/L at 25° C., 1 atm). Thus, a substantial quantity of $CO_2$ must be continuously supplied to and distributed throughout the porous preform to enable significant carbonate conversion. Utilizing gas phase diffusion offers a 100-fold increase in diffusion length over that of diffusing soluble CO.sub.2 an equivalent time in a liquid phase. Wollastonite porous matrices with a bulk density of ~1.88 g/cc, was prepared by wet pressing. By partially infiltrating this matrix, the reaction can proceed to a high degree of carbonation in a fixed period of time. For example, in the partially infiltrated state, 47.5±2.7 mol % conversion of $CaSiO_3$ into $CaCO_3$ and $SiO_2$ can be achieved in ~19 h at a temperature of 90° C. and a pressure of 2.36 atm. If all the same reaction conditions are maintained except that the pores are completely filled with water, a substantially lower carbonation conversion, 3.8±0.5 mol %, results.

To demonstrate this and the concept of practicing the DPS concepts to find conditions of enhanced reactivity and reaction yield (high fraction reacted), samples were reacted in a container made from a micro-porous Gore-Tex™ layer. Gore-Tex™ only allows water vapor species to and from the sample in a water-saturated atmosphere where the $CO_2$ activity is fixed at a pressure of 2.36 atm and a temperature of 90° C. A pool of water added below the sample to saturate the atmosphere and co-exist with the water vapor in the reaction throughout the duration of the reaction. Thus, the chosen water content in the porous matrix is fixed by the equilibrating water vapor and no evaporation occurs in the porous matrix. Instead, the porous matrix redistributes the water in the matrix homogenously using capillary flow with no mass loss. A porous matrix was prepared having a bulk density of 1.83-1.86 g/cc using the wet pressing method. For 19 h reactions, [when the DPS is increased from 0 to 60 vol %.], the degree of carbonation varies from 31.3 mol % to a maximum level of 49.6 mol % beyond this value, the degree of carbonation drops to 35.6 mol % when the DPS is increased to 80% and to 3.8 mol % when the DPS is 100%. These data are plotted in FIG. 10. These data demonstrate that optimum amounts of liquid water solvent at a DPS of 60 vol % in the pores maximizes the reaction yield for a 19 h process.

FIG. 10 represents a first example of carbonation reactions involving $CO_2$ as a gas phase and liquid water in the pore structure.

FIG. 11 represents a second example of carbonation reactions involving $CO_2$ as a gas phase and liquid water in the pore structure: Carmel Quartz Composition, 8×8×1.5" Vibratory Cast reacted, 90 C, 20 PSIG reaction.

FIG. 12 represents a third example of carbonation reactions involving $CO_2$ as a gas phase and liquid water in the pore structure: 1-2-3 Composition, 8×8×2" sample size reacted at 90 C 20 PSIG, at ~90% Relative humidity (~90% RH).

In each of these graphs, the systems differed from one another in that the sample size, shape, reactive wollastonite, reaction time, reaction temperature, relative humidity and reactor design all differed, yet each system was consistent within itself to show an optimum concentration where mass transport and reaction rate was optimized to maximize the amount of carbonate formed. The optimum DPS value varied from 20 to 60 vol %. In these cases, all the porous matrices have a relative density of about 60%. Thus, if a porous matrix was significantly more or less dense, this range of value can be even greater, assuming the pore size and tortuosity is the same. If pore size and tortuosity were different, the value may vary over an even wider range. Thus, a key step in optimizing the degree of carbonation and carbonation rate is to recognize that there is an optimum DPS value for any given method of water delivery. Knowing this value will enable the determination of the ideal conditions for minimizing the amount of reaction time as well as crystallize more binding phase by the hydrothermal liquid phase sintering reaction.

A further improvement of the invention can be made when gas species are mechanically convected by applying a pressure gradient across the porous matrix. If the gas is a reactive species, pores filled with solvent fluid can flow out of the pores leaving behind a film of solvent on the pores that can absorb the reactive species gas. Alternatively, partially filled pores will allow gas to flow through the pores as the solvent absorbs a portion of the gas flowing through.

The preferred approach should utilize low temperatures and low pressures to enable low cost processes to be developed. Thus, processes that retain a fraction of solvent in the pores to facilitate gaseous diffusion of reactive species are preferred over those that utilize quiescent fluids for reactions where a large fraction of product is desired. If gaseous precursors are not available, then methods that mechanically convect the infiltration fluid rapidly through the porous matrix are a viable alternative approach.

NON-LIMITING WORKING EXAMPLES

Example A

External, Transport by Means of Water Vapor
A1 Mixing
Eleven kg and one hundred and seventeen grams NYAD 400, 20.39 kg of mason sand, 16.76 kg of ¼" aggregate, and 16.76 kg of #67 aggregate were gathered in separate buckets. Then, batch water was prepared by premixing 4.9 kg deionized water, 55 ml Glenium, and 8 g welan gum. #67 and ¼" aggregate were loaded into the Marshall tow concrete mixer and roughly ¼ of the batch water solution was poured on the aggregate. The mixer was started and run at full speed for 1 minute. With mixer running the mason sand was poured in. After another 1 minute of mixing the NYAD400 was directly added into the mixer while it was running. The mixer was run for an additional 1 minute and then the remaining batch water was added directly into the mix while the mixer was running. Then the batch was mixed for 2 minutes and the mixer was stopped. The sides of the mixer were scraped with a putty knife to remove stuck material. The mixer was started again and run at full speed for an additional 3 minutes. The mixer was stopped and mix poured into 5 gallon buckets.

A2 Casting

One feet by 1' by 6" molds were lubricated by spraying WD-40 on a rag and wiping the inside surface of a clean mold down. Using the table scale, the weight of the mold was recorded. The lubricated mold was placed on the Vibco vibration table. The mix was removed from the bucket with a trowel, scoop, or by hand and the mold filled approximately ¼ of the way. Then the mold was vibrated on 60% power for approximately 1 minute or until the mix had formed to the mold. The process was repeated until the mold was full to the brim. A final weight on the samples was recorded before storing in an area to air-dry over-night A3 Drying Air-dry samples overnight. After 24 hr of air-drying, samples placed in an oven at 90° C. After 24 hr at 90° C. samples removed and de-molded. Samples were put back in the oven for an additional 48 hr to fully dry before reaction.

A4 Reacting

The autoclave used for curing (reacting) the samples is a stainless steel, horizontal, indirect steam unit with a radius of 7 and a length of 12 feet. Samples were loaded into the pre-heated autoclave at 90° C. After the autoclave door was closed, it was evacuated down to ~14 psig in 15 minutes. The autoclave was back filled with heated $CO_2$ gas and steam at 147.5° C. to provide additional heat to the samples and to account for the heat loss occurred during sample loading and expansion of the gasses. Once the pressure in the autoclave reached 0 psig, the fan of the autoclave was started at 4900 RPM. The $CO_2$ was cut off when the total pressure reached 10 psig. The autoclave temperature was set to 90° C. and hot water at 95° C. was circulated at the bottom of the autoclave to keep the unit saturated with water vapor. The system was allowed to equilibrate for 45 min to 1 hr (total psi reaching approximately 16 psig), and then the autoclave pressure was increased to 20 psig by filling with heated $CO_2$ gas only. The samples were cured for 19 hours.

The reacted samples were dried in a dying oven at 90° C. until there was no further weight loss. The extent of the reaction was calculated based on the weight gain during the reaction. The average extent of reaction was 35%.

Example B

Internal, Partial Drying

B1 Mixing

Eleven kg and one hundred and seventeen grams NYAD 400, 20.39 kg of mason sand, 16.76 kg of ¼" aggregate, and 16.76 kg of #67 aggregate were gathered in separate buckets. Then batch water was prepared by premixing 4.9 kg deionized water, 55 ml Glenium, and 8 g welan gum. #67 and ¼" aggregate were loaded into the Marshalltow concrete mixer and roughly ¼ of the batch water solution was poured on the aggregate. The mixer was started and run at full speed for 1 minute. With mixer running the mason sand was poured in. After another 1 minute of mixing the NYAD400 was directly added into the mixer while it was running. The mixer was run for an additional 1 minute and then the remaining batch water was added directly into the mix while the mixer was running. Then the batch was mixed for 2 minutes and the mixer was stopped. The sides of the mixer were scraped with a putty knife to remove stuck material. The mixer was started again and ran at full speed for an additional 3 minutes. The mixer was stopped and mix poured into 5 gallon buckets.

B2 Casting

One feet by 1' by 6" were lubricated by spraying WD-40 on a rag and wiping the inside surface of a clean mold down. Using the table scale, the weight of the mold was recorded. The lubricated mold was placed on the Vibco vibration table. The mix was removed from the bucket with a trowel, scoop, or by hand and the mold filled approximately ¼ of the way. Then the mold was vibrated on 60% power for approximately 1 minute or until the mix had formed to the mold. The process was repeated until the mold was full to the brim. A final weight on the samples was recorded before storing in an area to air-dry over-night B3 Drying Air-dry samples overnight. After 24 hr of air-drying, samples placed in an oven at 90° C. After 24 hr at 90° C. samples removed and de-molded. Samples put back in the oven until the samples were dried down to 2.2 wt % residual water.

B4 Reacting

The autoclave used for curing the samples is a stainless steel, horizontal, indirect steam unit with a radius of 7 and a length of 12 feet. Samples were loaded in to the pre-heated autoclave at 90° C. After the autoclave door was closed the autoclave was back filled with heated $CO_2$ gas and steam at 147.5° C. to provide additional heat to the samples and to account for the heat loss occurred during sample loading and expansion of the gasses. The fan of the autoclave was started at 4900 RPM. The $CO_2$ was cut off when the total pressure reached 10 psig. The autoclave temperature was set to 90° C. and hot water at 95° C. was circulated at the bottom of the autoclave to keep the unit saturated with water vapor. The system was allowed to equilibrate for 45 min to 1 hr (total psi reaching approximately 16 psig), and then the autoclave pressure was increased to 20 psig by filling with heated $CO_2$ gas only. The samples were cured for 19 hours.

The reacted samples were dried in a dying oven at 90° C. until there was no further weight loss. The extent of the reaction was calculated based on the weight gain during the reaction. The average extent of reaction was 53%.

In some embodiments, the mechanically convection comprises one of pressurized flow, capillary electro-osmotic flow, magneto-osmotic flow, and temperature- and chemical-gradient driven flow.

In some embodiments, the monolithic ceramic body has a degree of pore saturation value of from about 15% to about 70%.

Definitions

Any reference in the claims to an electronic signal or an electromagnetic signal (or their equivalents) is to be understood that in a preferred embodiment the signal is a non-transitory electronic signal or a non-transitory electromagnetic signal. If the signal per se is not claimed, the reference may in some instances be to a description of a propagating or transitory electronic signal or electromagnetic signal.

Theoretical Discussion

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

Any patent, patent application, patent application publication, journal article, book, published paper, or other publicly available material identified in the specification is hereby incorporated by reference herein in its entirety. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

While the present invention has been particularly shown and described with reference to the preferred mode as illustrated in the drawing, it will be understood by one skilled in the art that various changes in detail may be affected therein without departing from the spirit and scope of the invention as defined by the claims.

What is claimed is:

1. An apparatus for curing materials that cure under reaction with $CO_2$, comprising:
    a curing chamber configured to contain a material that consumes $CO_2$ as a reagent, said material does not cure in an absence of $CO_2$ during curing, said material does not cure in a presence of water alone, and said material does not consume water during curing, said curing chamber having at least one port configured to allow said material to be introduced into said curing chamber and to be removed from said curing chamber, and having at least one closure for said port, said closure configured to provide an atmospheric seal when closed so as to prevent contamination of a gas present in said curing chamber by gas outside said curing chamber;
    a source of carbon dioxide or air configured to provide gaseous carbon dioxide or air to said curing chamber by way of a gas entry port in said curing chamber, said source of carbon dioxide or air having at least one flow regulation device configured to control a flow rate of said gaseous carbon dioxide or air into said curing chamber;
    a gas flow subsystem configured to circulate said gaseous carbon dioxide or air through said curing chamber;
    a temperature control subsystem configured to control a temperature of said gas within said chamber;
    a humidity control subsystem configured to control a humidity in said gas within said chamber; and
    at least one controller in communication with at least one of said source of carbon dioxide, said gas flow subsystem, said temperature control subsystem, and said humidity control subsystem,
    said at least one controller configured to control independently at least a respective one of a flow rate of said gas inside the chamber, circulation of said gas through said curing chamber, said temperature of said gas, and said humidity in said gas,
    said at least one controller configured to provide a time of residence in a first drying phase (Phase 1), wherein a residence time in said first drying phase is configured to be minimized, and said at least one controller is configured to transition from said first drying phase (Phase 1) to a second carbonation phase (Phase 2) at the end of said first drying phase (Phase 1).

2. The apparatus of claim 1, wherein the apparatus is configured to first expose the material to the first drying phase (Phase 1) in absence of deliberately added $CO_2$.

3. The apparatus of claim 1, wherein the apparatus is configured to first expose the material to the first drying phase (Phase 1) in presence of $CO_2$.

4. The apparatus of claim 1, wherein the apparatus is configured to detect a transition from the first drying phase (Phase 1) to the second carbonation phase (Phase 2) by detecting a change in one or more electrical properties of the material on the surface or in the bulk thereof.

5. The apparatus of claim 4, wherein the one or multiple electrical properties of the material include at least one of a surface resistivity, a volume resistivity, a conductivity, an impedance, a capacitance, a dielectric constant, a dielectric strength, a permittivity, a piezoelectric constant, and a Seebeck coefficient.

6. The apparatus of claim 1, wherein the apparatus is configured to detect the transition from the first drying phase (Phase 1) to the second carbonation phase (Phase 2) by detecting a change in the quantity of water that is removed from the material.

7. The apparatus of claim 1, wherein the apparatus is configured to detect the transition from the first drying phase (Phase 1) to the second carbonation phase (Phase 2) by detecting a change in at least one of a $CO_2$ concentration and an $O_2$ concentration in the gas circulating in the chamber.

8. The apparatus of claim 1, wherein the apparatus is configured to detect the transition from the first drying phase (Phase 1) to the second carbonation phase (Phase 2) by detecting a change in temperature of the material.

9. The apparatus of claim 1, wherein the apparatus is configured to measure, track and control the pressure inside the chamber throughout the process in any of the first drying phase (Phase 1) and the second curing phase (Phase 2).

10. The apparatus of claim 1, wherein the apparatus is configured to detect the transition from the first drying phase (Phase 1) to the second carbonation phase (Phase 2) by detecting a change in the pH of the material.

11. The apparatus of claim 1, wherein the temperature control subsystem further comprises at least one energy source configured to heat at least one of the gas and the material.

12. The apparatus of claim 11, wherein the energy source is configured to control the time of residence in at least one of the first drying phase (Phase 1) and the second carbonation phase (Phase 2).

13. The apparatus of claim 11, wherein said energy source is configured to employ fossil fuel combustion.

14. The apparatus of claim 11, wherein said energy source is configured to employ electrical resistance heating.

15. The apparatus of claim 11, wherein said energy source is configured to employ dielectric heating.

16. The apparatus of claim 11, wherein said energy source is configured to employ a radiation heat source.

17. The apparatus of claim 1, wherein the humidity control subsystem is configured to control water extraction from the material.

18. The apparatus of claim 17, wherein the humidity control subsystem is configured to control the water extraction using a desiccant.

19. The apparatus of claim 17, wherein the humidity control subsystem is configured to control the water extraction using one of a heat exchanger and a chiller.

20. The apparatus of claim 1, wherein the gas flow subsystem is configured to control the circulation of the gas in the chamber to control the water removal in the first drying phase (Phase 1) and to control a rate of reaction in the second carbonation phase (Phase 2).

21. The apparatus of claim 1, wherein the gas flow subsystem is configured to control a flow and a velocity of the gas adjacent to the material.

22. The apparatus of claim 1, wherein the gas flow subsystem is configured to control a flow and velocity of the gas using an external circulation system.

23. The apparatus of claim 1, wherein, the gas flow regulation device is configured to change the concentration of $CO_2$ during the first drying phase (Phase 1) and second carbonation phase (Phase 2) to maximize efficiency of $CO_2$ consumption during a curing process.

24. The apparatus of claim 22, wherein the concentration of $CO_2$ is reduced during the second carbonation phase (Phase 2).

25. A method of curing a material that consumes $CO_2$ as a reagent, said material does not cure in an absence of $CO_2$ during curing, said material does not cure in a presence of water alone, and said material does not consume water during, comprising the steps of:
  providing an apparatus comprising:
    a curing chamber configured to contain a material that consumes $CO_2$ as a reagent, said material does not cure in the absence of $CO_2$ during curing, said material does not cure in the presence of water alone, and said material does not consume water during curing, said curing chamber having at least one port configured to allow said material to be introduced into said curing chamber and to be removed from said curing chamber, and having at least one closure for said port, said closure configured to provide an atmospheric seal when closed so as to prevent contamination of a gas present in said curing chamber by gas outside said curing chamber;
    a source of carbon dioxide or air configured to provide gaseous carbon dioxide or air to said curing chamber by way of a gas entry port in said curing chamber, said source of carbon dioxide or air having at least one flow regulation device configured to control a flow rate of said gaseous carbon dioxide or air into said curing chamber;
    a gas flow subsystem configured to circulate said gaseous carbon dioxide or air through said curing chamber;
    a temperature control subsystem configured to control a temperature of said gas within said chamber;
    a humidity control subsystem configured to control a humidity in said gas within said chamber; and
    at least one controller in communication with at least one of said source of carbon dioxide, said gas flow subsystem, said temperature control subsystem, and said humidity control subsystem,
  said at least one controller is configured to control independently at least a respective one of a flow rate of said gas inside the chamber, said circulation of said gas through said curing chamber, said temperature of said gas, and said humidity in said gas,
  said at least one controller is configured to provide a time of residence in a first drying phase (Phase 1), wherein a residence time in said first drying phase is configured to be minimized, and said at least one controller is configured to transition from said first drying phase (Phase 1) to a second carbonation phase (Phase 2) at the end of said first drying phase (Phase 1),
  performing a first drying phase having a first time of residence in said first dying phase, and
  performing a second curing phase at the end of said first drying phase.

* * * * *